US010986623B2

(12) United States Patent
Lee et al.

(10) Patent No.: US 10,986,623 B2
(45) Date of Patent: Apr. 20, 2021

(54) METHOD FOR TRANSMITTING AND RECEIVING PHYSICAL DOWNLINK SHARED CHANNEL IN WIRELESS COMMUNICATION SYSTEM AND DEVICE SUPPORTING SAME

(71) Applicant: LG ELECTRONICS INC., Seoul (KR)

(72) Inventors: Hyunho Lee, Seoul (KR); Kyuhwan Kwak, Seoul (KR); Seungmin Lee, Seoul (KR)

(73) Assignee: LG ELECTRONICS INC, Seoul (KR)

(*) Notice: Subject to any disclaimer, the term of this patent is extended or adjusted under 35 U.S.C. 154(b) by 0 days.

(21) Appl. No.: 16/790,642

(22) Filed: Feb. 13, 2020

(65) Prior Publication Data

US 2020/0187177 A1    Jun. 11, 2020

Related U.S. Application Data

(63) Continuation of application No. PCT/KR2019/004594, filed on Apr. 16, 2019.

(Continued)

(51) Int. Cl.
    *H04W 4/00*     (2018.01)
    *H04W 72/04*    (2009.01)
    *H04W 8/24*     (2009.01)

(52) U.S. Cl.
    CPC ........... *H04W 72/042* (2013.01); *H04W 8/24* (2013.01)

(58) Field of Classification Search
    CPC . H04W 72/042; H04W 8/24; H04W 72/0446; H04W 88/02; H04W 72/1289;

(Continued)

(56) References Cited

U.S. PATENT DOCUMENTS 10,798,731 B2* 10/2020 Lee .................. H04W 72/1268
2015/0208396 A1* 7/2015 Guan ................. H04W 72/005
                                                        370/329

(Continued)

FOREIGN PATENT DOCUMENTS

KR    10-2015-0034584    4/2015
KR    10-2018-0004404    1/2018

(Continued)

OTHER PUBLICATIONS

PCT International Application No. PCT/KR2019/004594, International Search Report dated Aug. 14, 2019, 3 pages.

(Continued)

*Primary Examiner* — Stephen M D'Agosta
(74) *Attorney, Agent, or Firm* — Lee Hong Degerman Kang Waimey

(57) ABSTRACT

Disclosed are a method of transmitting and receiving a physical downlink shared channel in a wireless communication system and an apparatus supporting the method. More specifically, the method performed by a user equipment may comprise transmitting, to a base station (BS), capability information including first information indicating support for a PDSCH repetition-related operation; receiving, from the BS, an higher layer signal including second information for configuring whether to enable the PDSCH repetition-related operation; receiving Downlink Control Information (DCI) related to reception of a PDSCH repetition from the BS when the second information is configured as enable; and receiving the PDSCH repeatedly from the BS based on the DCI.

6 Claims, 24 Drawing Sheets

Related U.S. Application Data

(60) Provisional application No. 62/658,512, filed on Apr. 16, 2018, provisional application No. 62/659,095, filed on Apr. 17, 2018, provisional application No. 62/659,674, filed on Apr. 18, 2018, provisional application No. 62/664,257, filed on Apr. 29, 2018.

(58) Field of Classification Search
CPC ........ H04W 24/08; H04L 1/08; H04L 5/0053; H04L 1/0026; H04L 5/001; H04L 5/0007; H04L 5/0039; H04L 5/0044; H04B 17/318; H04B 17/364; H04J 11/0023; H04J 11/0053
See application file for complete search history.

(56) References Cited

U.S. PATENT DOCUMENTS

| | | | | |
|---|---|---|---|---|
| 2015/0245322 | A1* | 8/2015 | Shimezawa | H04L 5/0053 370/329 |
| 2016/0105264 | A1* | 4/2016 | Chen | H04W 4/70 370/329 |
| 2016/0192333 | A1* | 6/2016 | Wang | H04W 72/042 370/329 |
| 2016/0205571 | A1* | 7/2016 | Yi | H04L 1/1812 370/252 |
| 2016/0219587 | A1* | 7/2016 | Lin | H04L 5/0044 |
| 2016/0295574 | A1* | 10/2016 | Papasakellariou | H04W 52/34 |
| 2016/0338018 | A1* | 11/2016 | Awad | H04W 72/042 |
| 2016/0338020 | A1* | 11/2016 | Gao | H04L 1/0067 |
| 2016/0338048 | A1* | 11/2016 | Aiba | H04L 1/1887 |
| 2016/0345119 | A1* | 11/2016 | Futaki | H04W 72/042 |
| 2016/0345300 | A1* | 11/2016 | Kim | H04L 5/0053 |
| 2016/0345301 | A1* | 11/2016 | Webb | H04W 72/0446 |
| 2017/0013618 | A1* | 1/2017 | Shin | H04L 5/001 |
| 2017/0156132 | A1* | 6/2017 | Blankenship | H04L 5/001 |
| 2017/0163396 | A1* | 6/2017 | Blankenship | H04W 72/042 |
| 2017/0273135 | A1* | 9/2017 | Siomina | H04W 76/28 |
| 2017/0280483 | A1* | 9/2017 | Liu | H04L 1/08 |
| 2017/0288808 | A1* | 10/2017 | Blankenship | H04L 1/0016 |
| 2017/0317794 | A1* | 11/2017 | You | H04L 5/0051 |
| 2018/0035242 | A1* | 2/2018 | Yi | H04W 72/044 |
| 2018/0077722 | A1* | 3/2018 | Awad | H04W 72/0446 |
| 2018/0167968 | A1* | 6/2018 | Liu | H04L 1/1812 |
| 2018/0176893 | A1* | 6/2018 | Zhang | H04W 74/0833 |
| 2018/0270795 | A1* | 9/2018 | Morioka | H04L 1/1838 |
| 2018/0302895 | A1* | 10/2018 | Akkarakaran | H04J 3/1694 |
| 2019/0174466 | A1* | 6/2019 | Zhang | H04L 5/005 |

FOREIGN PATENT DOCUMENTS

| | | |
|---|---|---|
| KR | 10-2018-0008658 | 1/2018 |
| KR | 20180036888 | 4/2018 |

OTHER PUBLICATIONS

Qualcomm Incorporated, "Downlink Enhancements for URLLC," 3GPP TSG-RAN WG1 #92b, R1-1804933, Apr. 2018, 5 pages.

LG Electronics, "Discussion on blind/HARQ-less repetition for scheduled DL-SCH operation," 3GPP TSG-RAN WG1 Meeting #92bis, R1-1804531, Apr. 2018, 5 pages.

MediaTek Inc., "Blind/HARQ-less repetitions for scheduled DL-SCH in LTE HRLLC Document for: Discussion and Decision," 3GPP TSG-RAN WG1 Meeting #92bis, R1-1804136, Apr. 2018, 7 pages.

Huawei, HiSilicon, "Compact DCI for LTE URLLC," 3GPP TSG-RAN WG1 Meeting #92, R1-1801873, Feb. 2018, 9 pages.

Korean Intellectual Property Office Application No. 10-2019-7038365, Notice of Allowance dated Feb. 11, 2020, 2 pages.

European Patent Office Application Serial No. 19787797.0, Search Report dated Feb. 11, 2021, 12 pages.

LG Electronics, "PDSCH related techniques for LTE URLLC", R1-1802181, 3GPP TSG RAN WG1 Meeting #92, Mar. 2018, 5 pages.

ZTE, Sanechips, "Discussion on PDSCH repetition for LLE URLLC", R1-1803962, 3GPP TSG RAN WG1 Meeting #92bis, Apr. 2018, 4 pages.

Qualcomm Incorporated, "PCFICH Enhancements for URLLC", R2-1806001, 3GPP TSG-RAN WG2 Meeting #101bis, Apr. 2016, 3 pages.

Offline session chair (Nokia), "Way forward for handling URLLC for LTE feature", RP-180586, 3GPP TSG RAN #79, Mar. 2018, 2 pages.

\* cited by examiner

[FIG. 1]
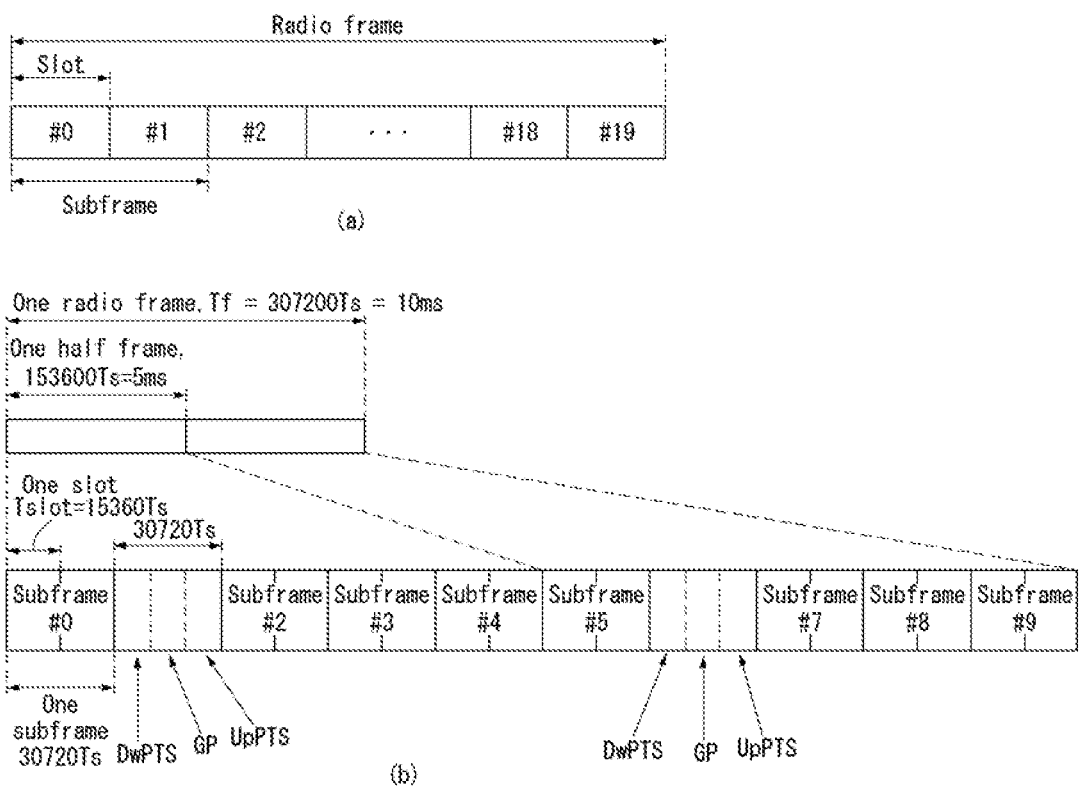

[FIG. 2]
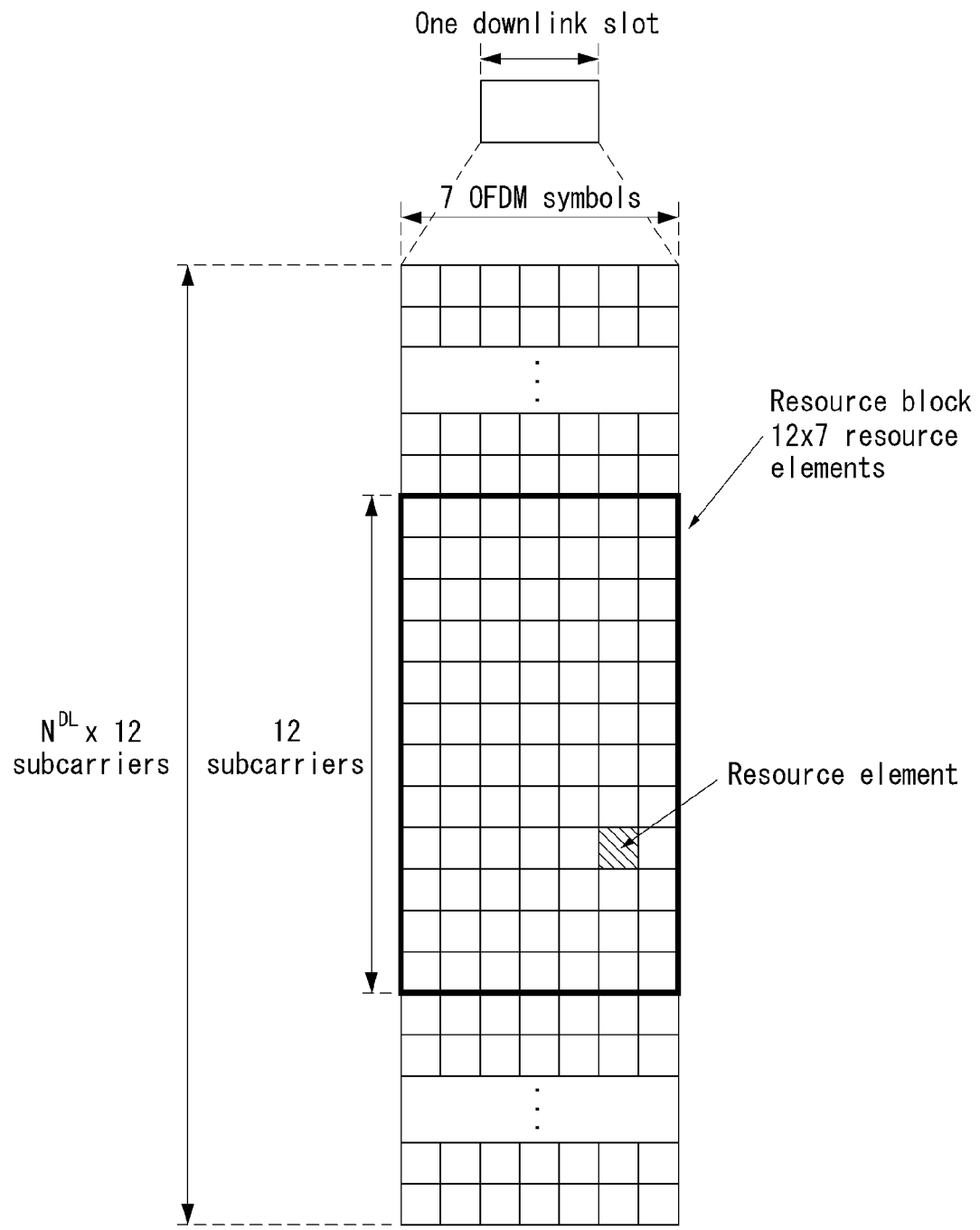

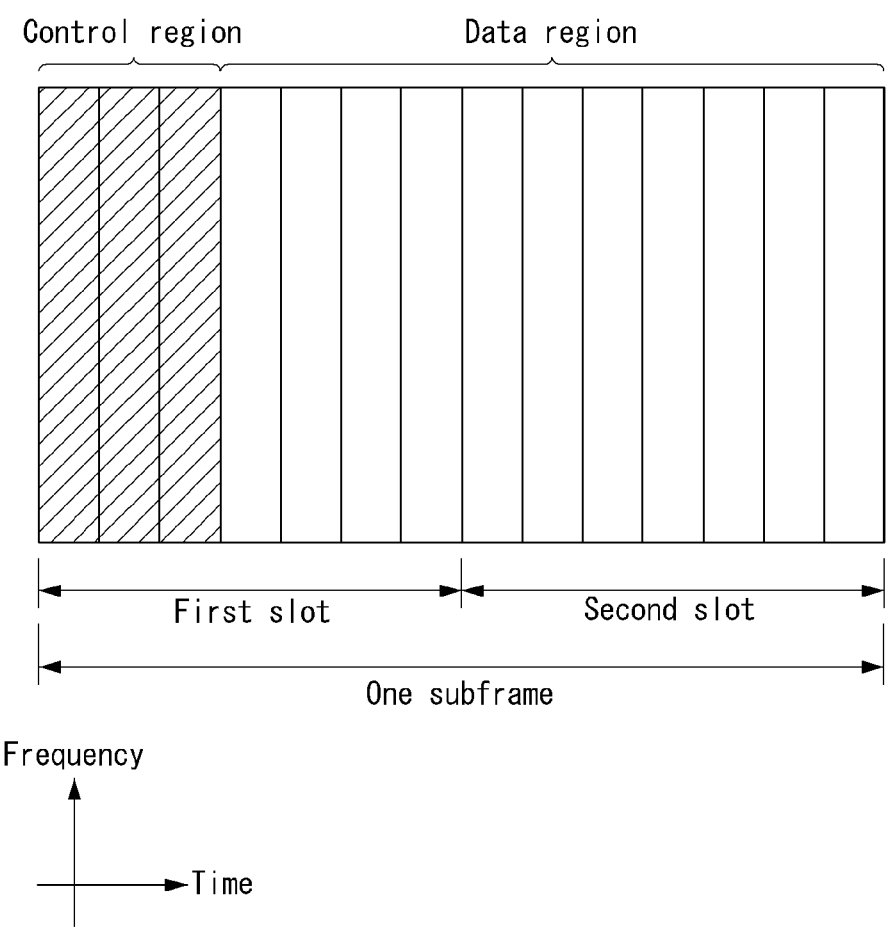

[FIG. 4]
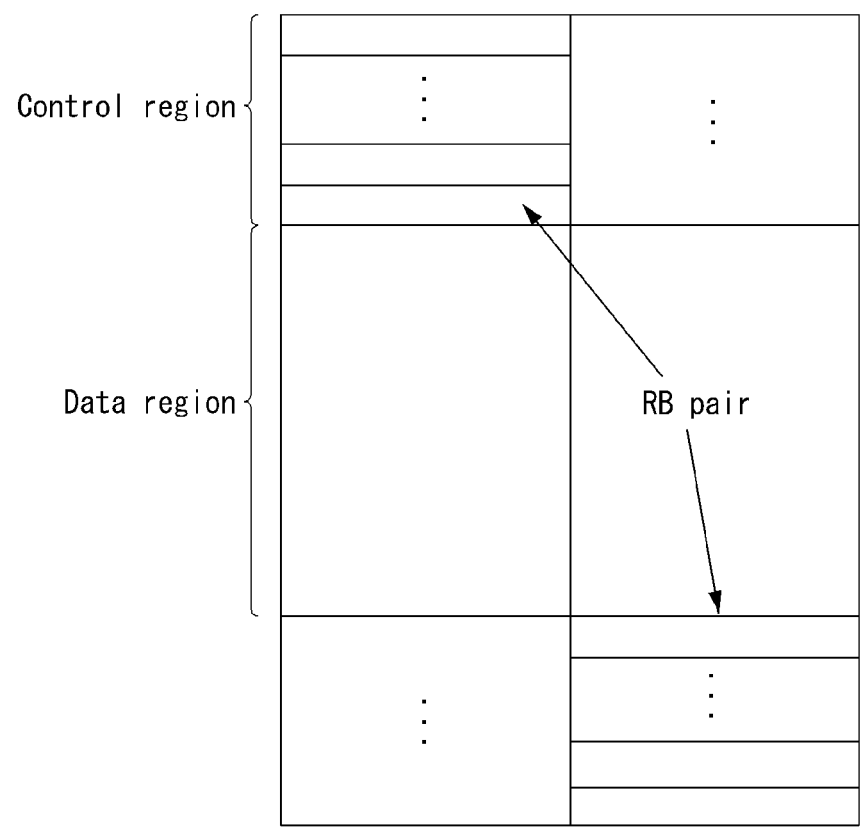

[FIG. 5]
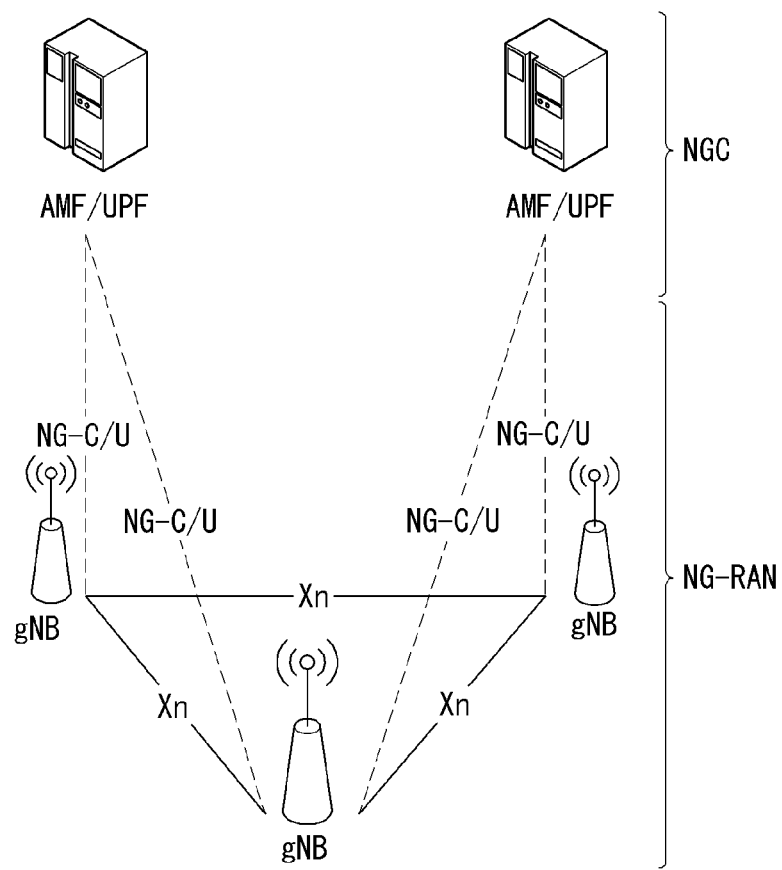

[FIG. 6]
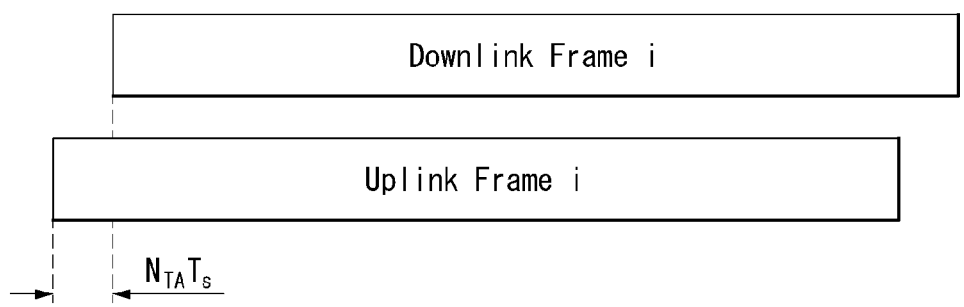

[FIG. 7]
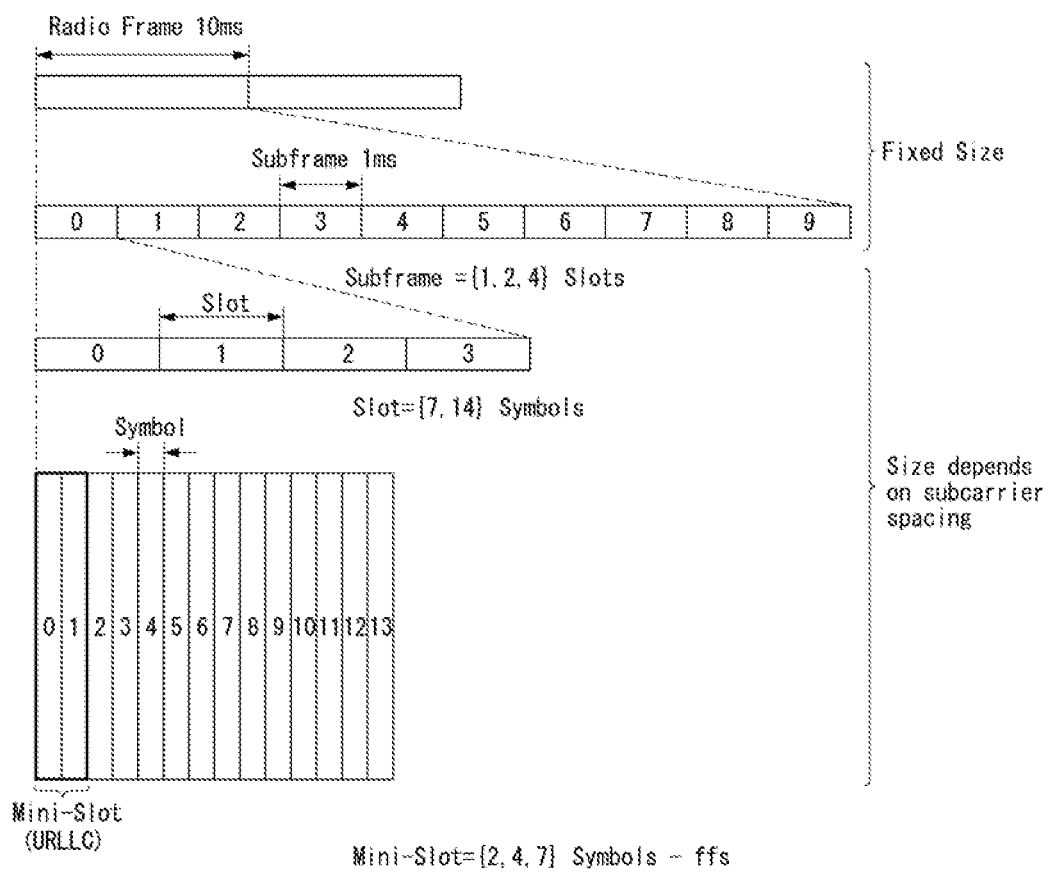

[FIG. 8]
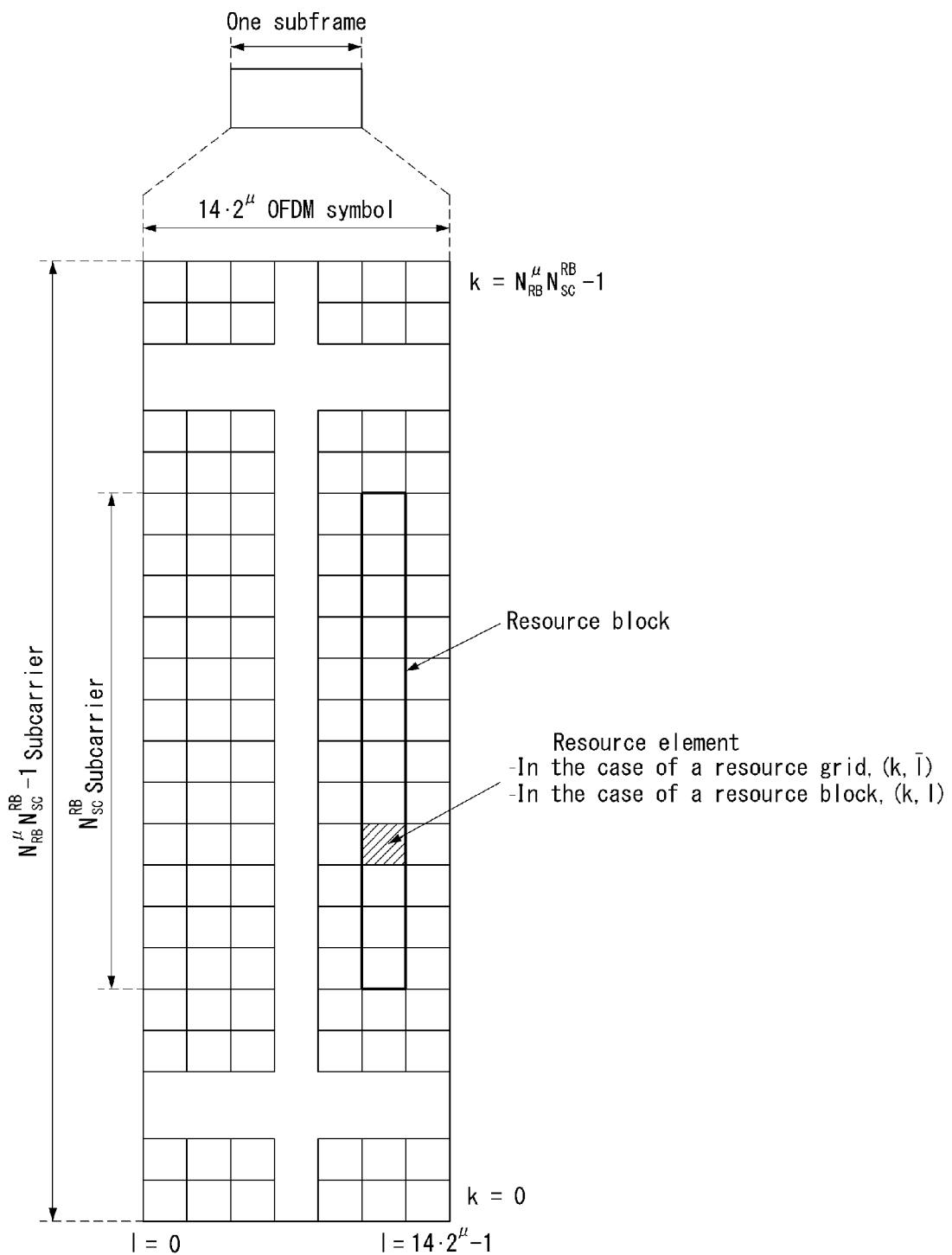

[FIG. 9]
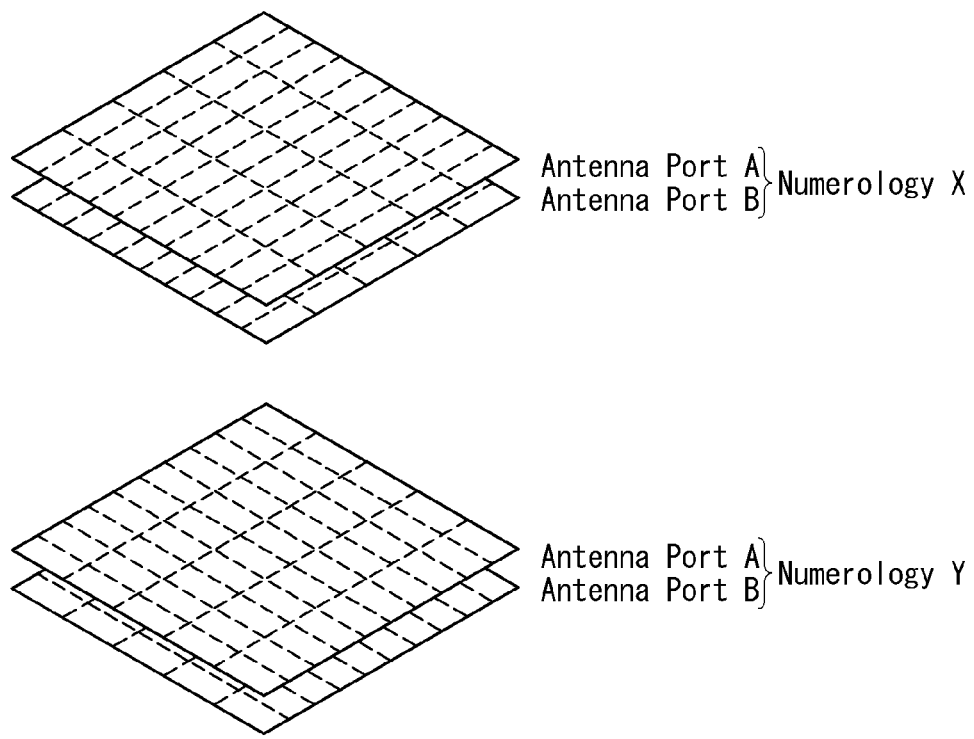

[FIG. 10]
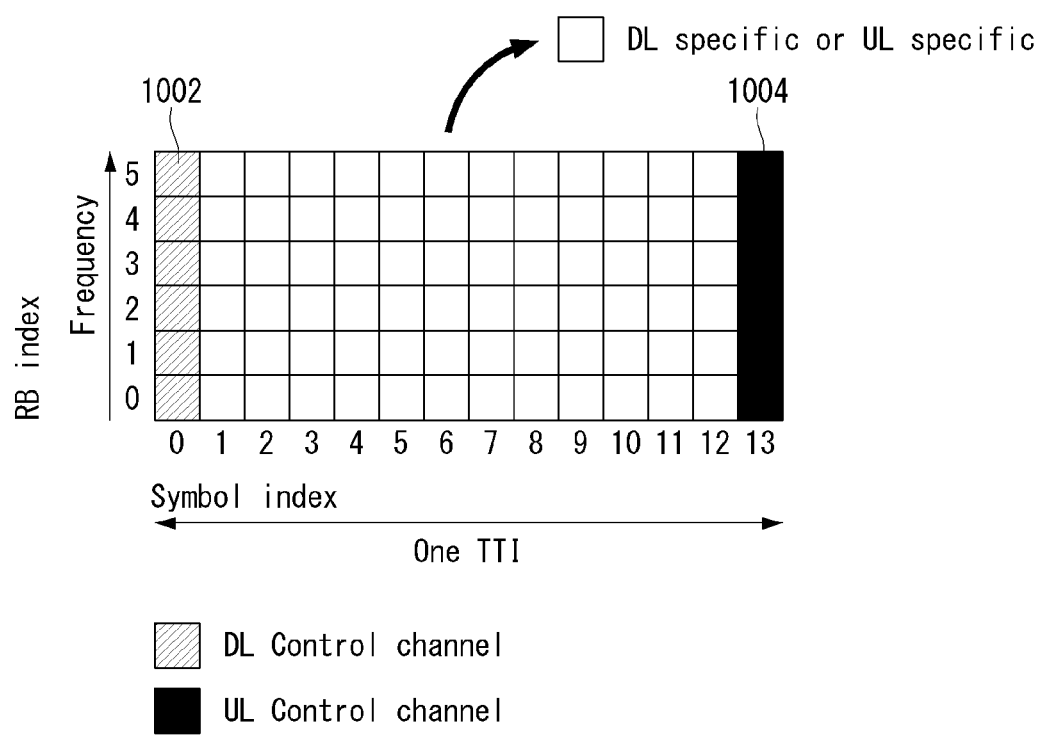

[FIG. 11]
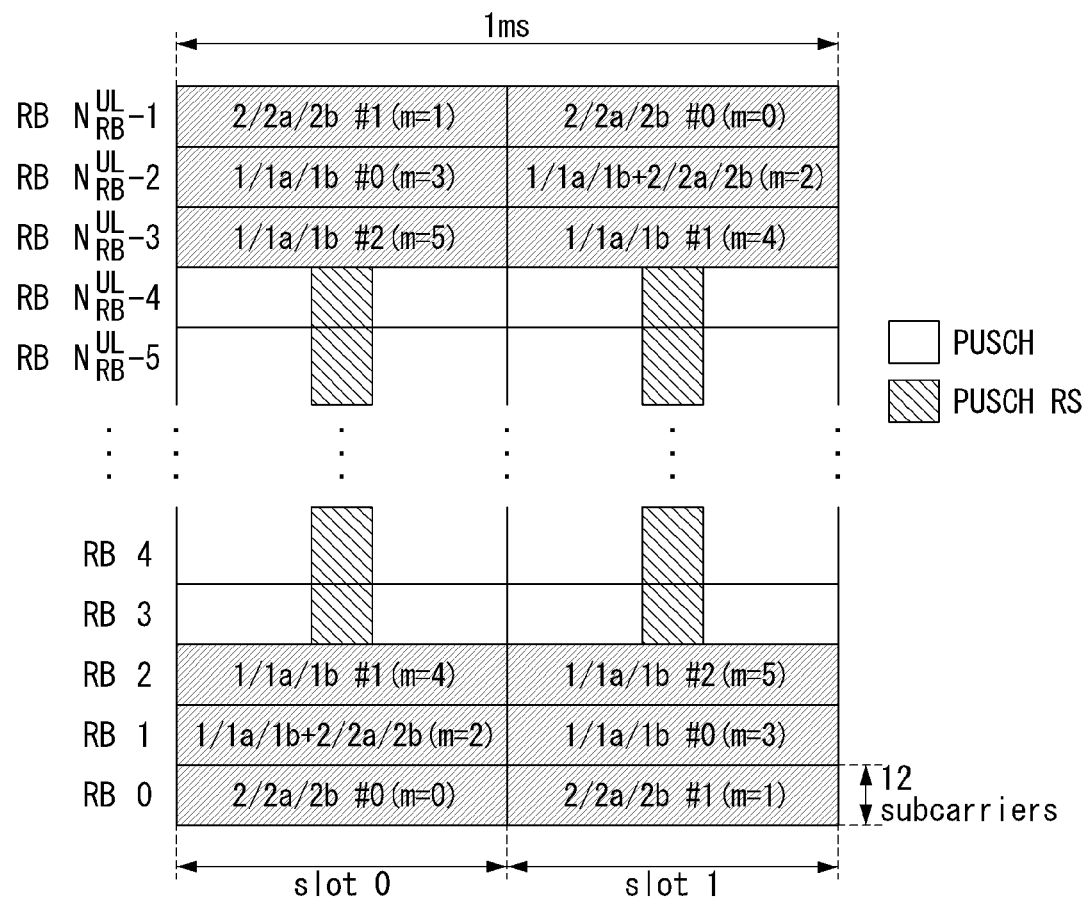

[FIG. 12]
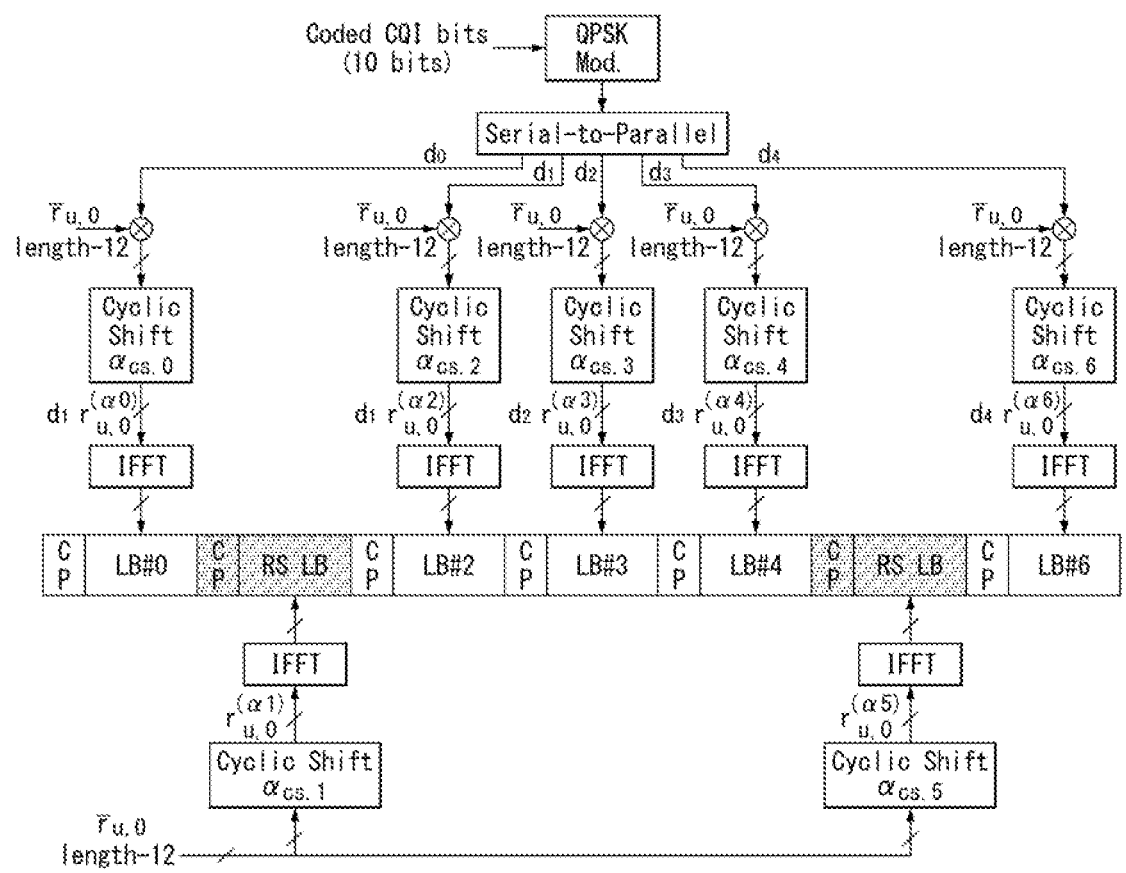

[FIG. 13]
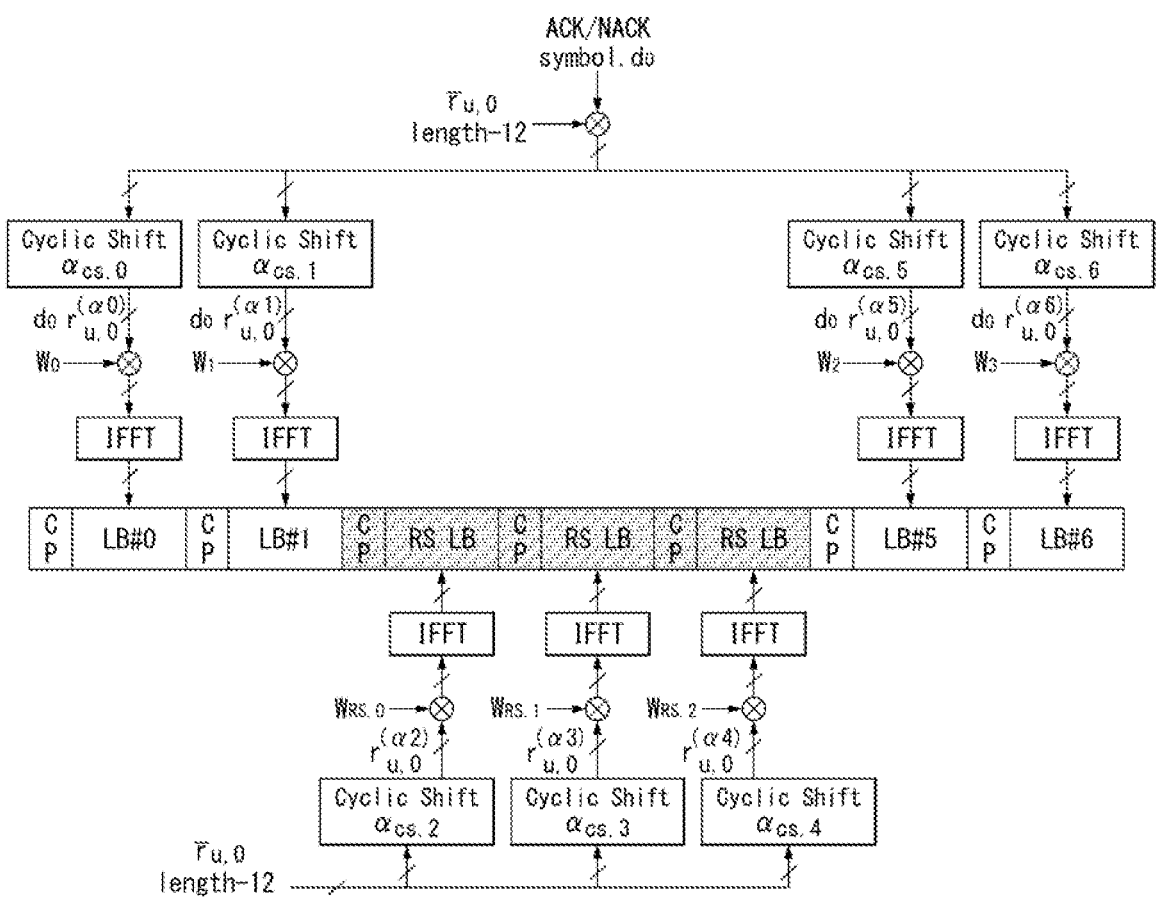

[FIG. 14]
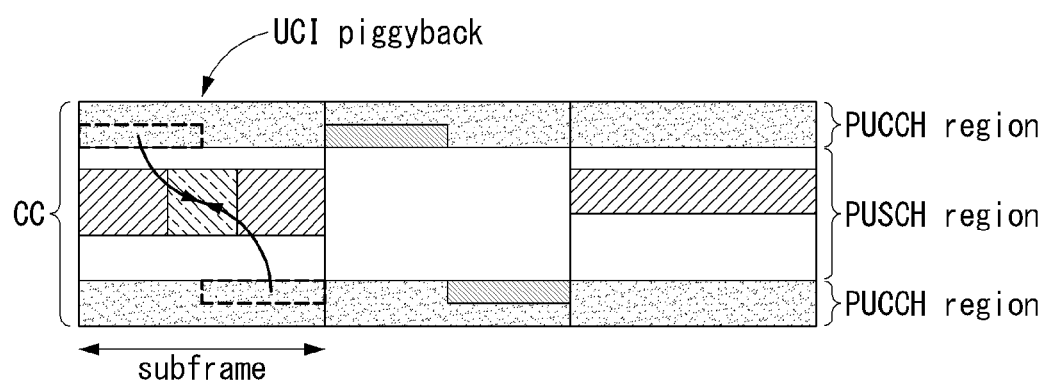

[FIG. 15]
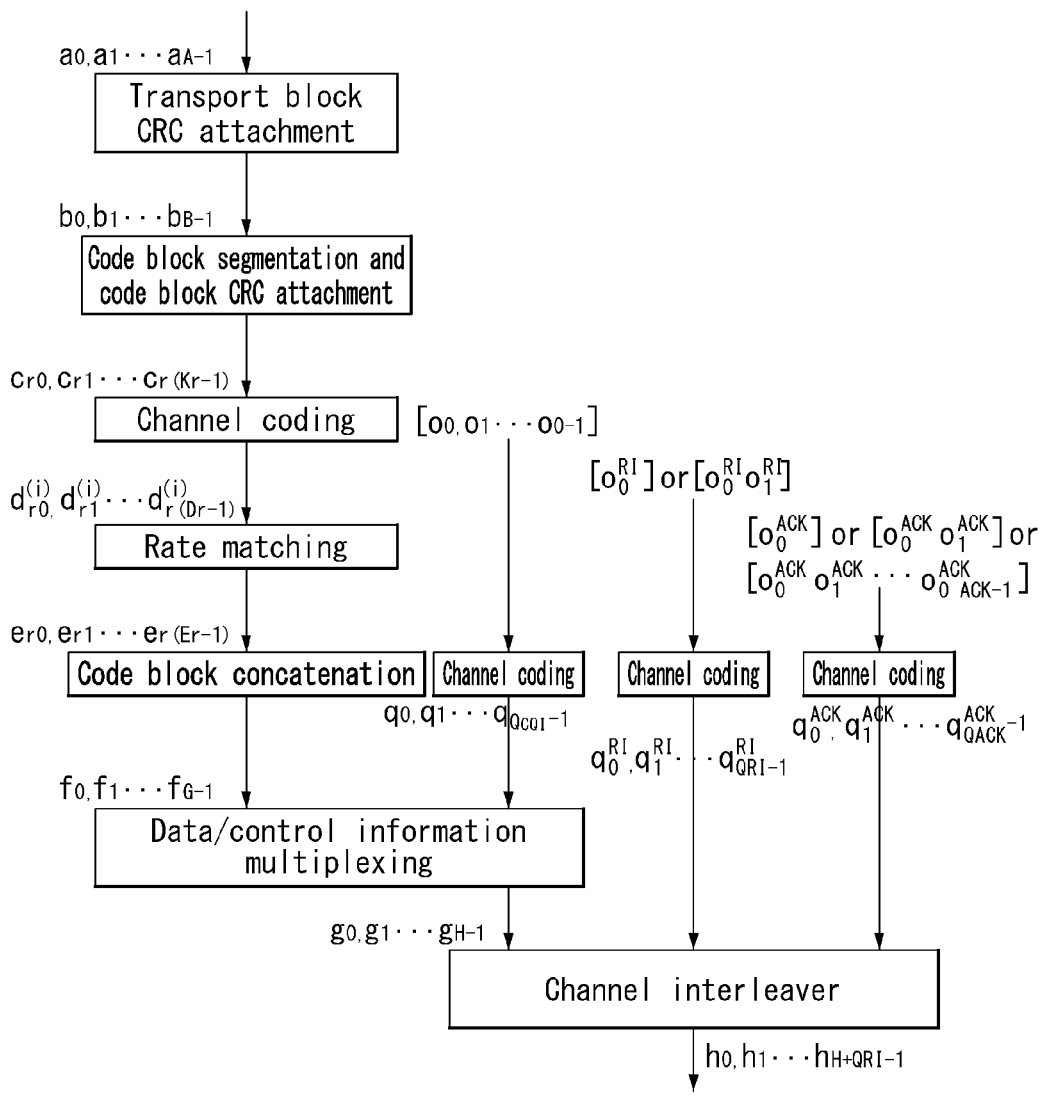

[FIG. 16]
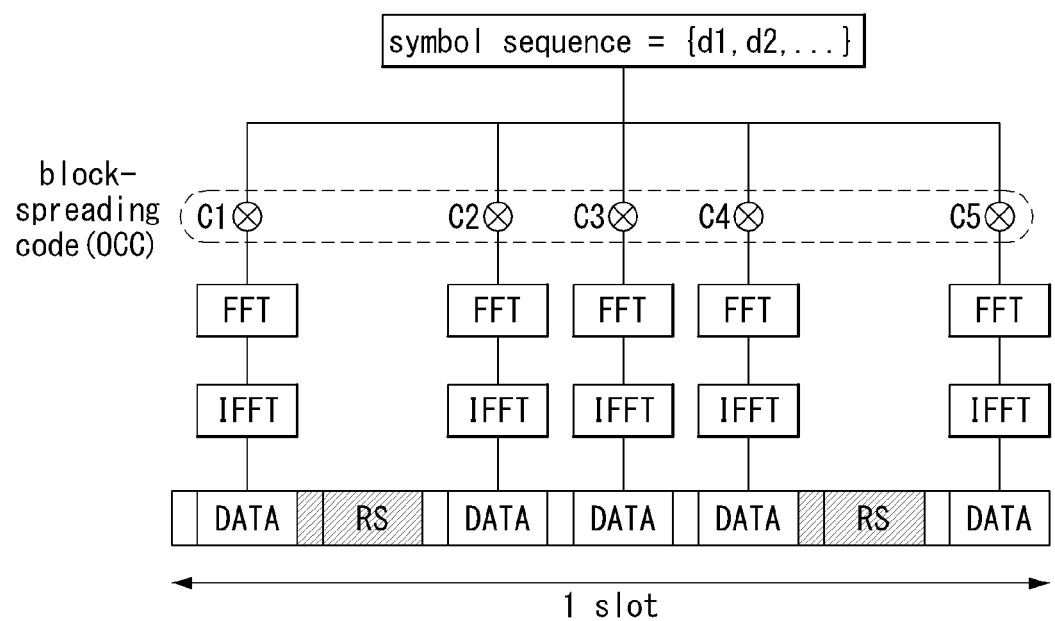

[FIG. 17]
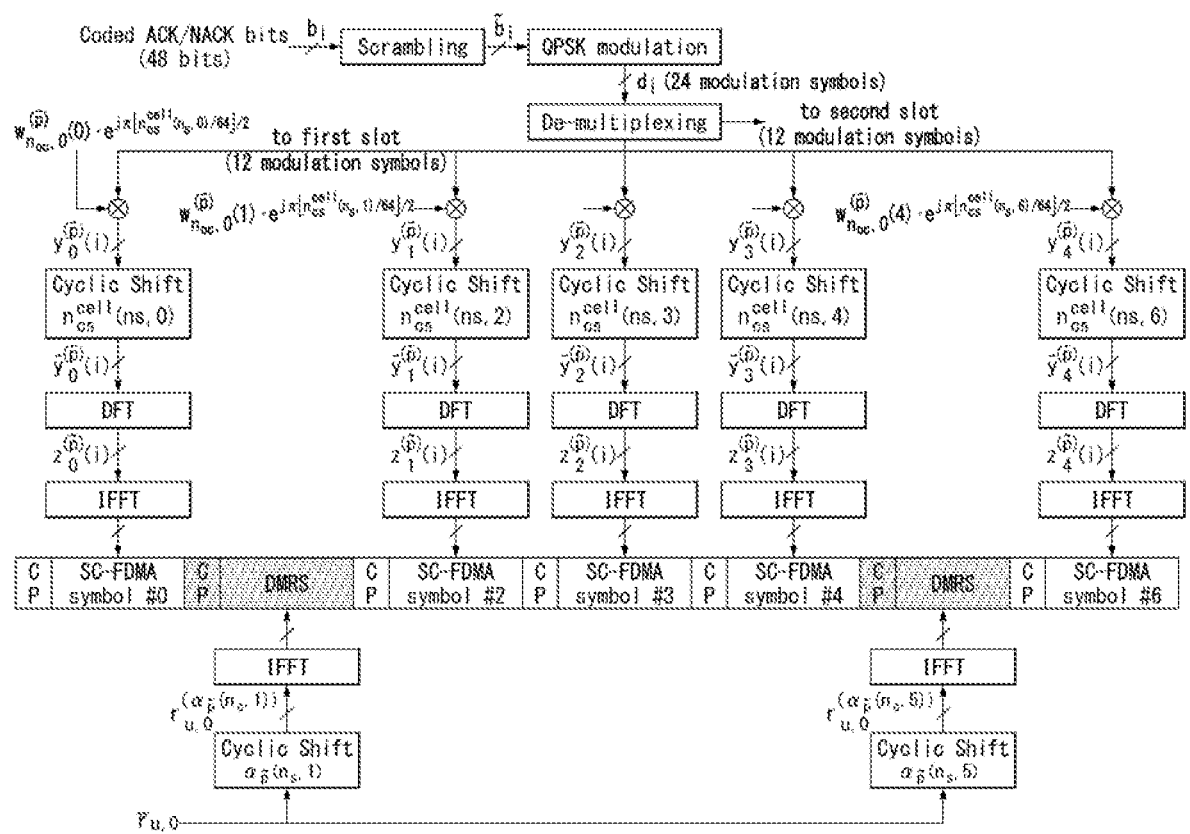

[FIG. 18]
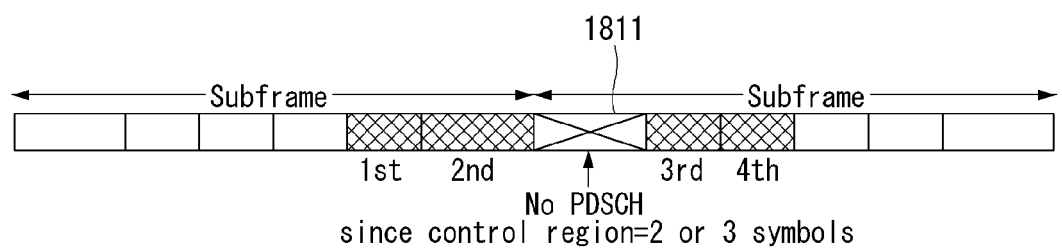
(a)
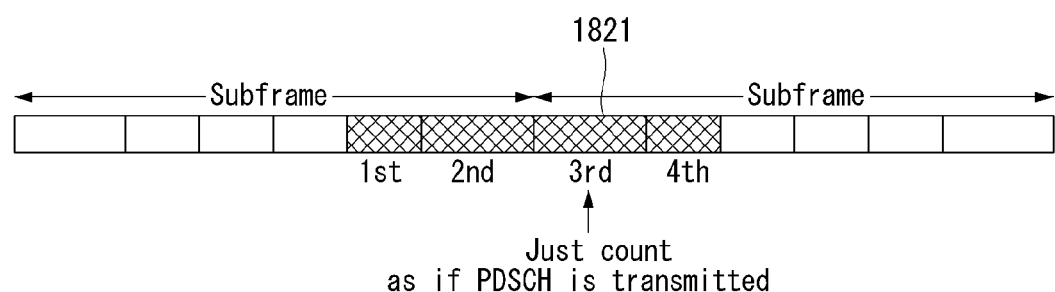
(b)

[FIG. 19]
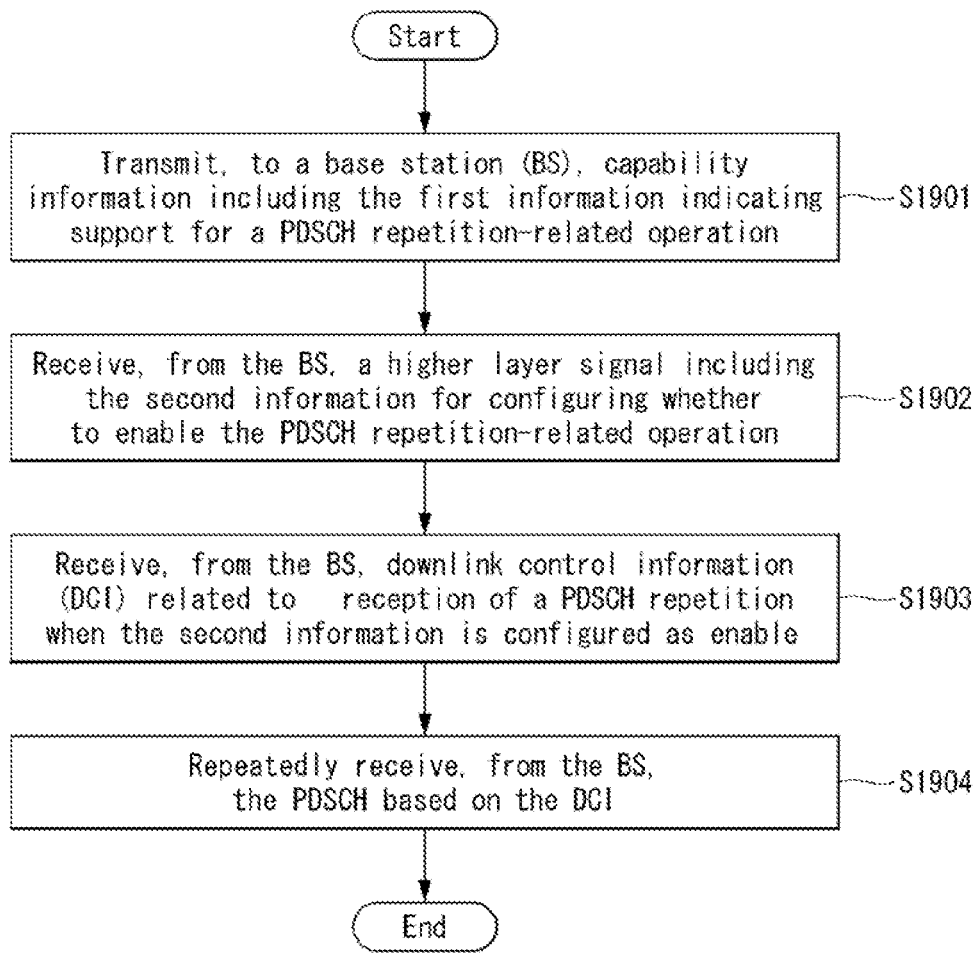

[FIG. 20]
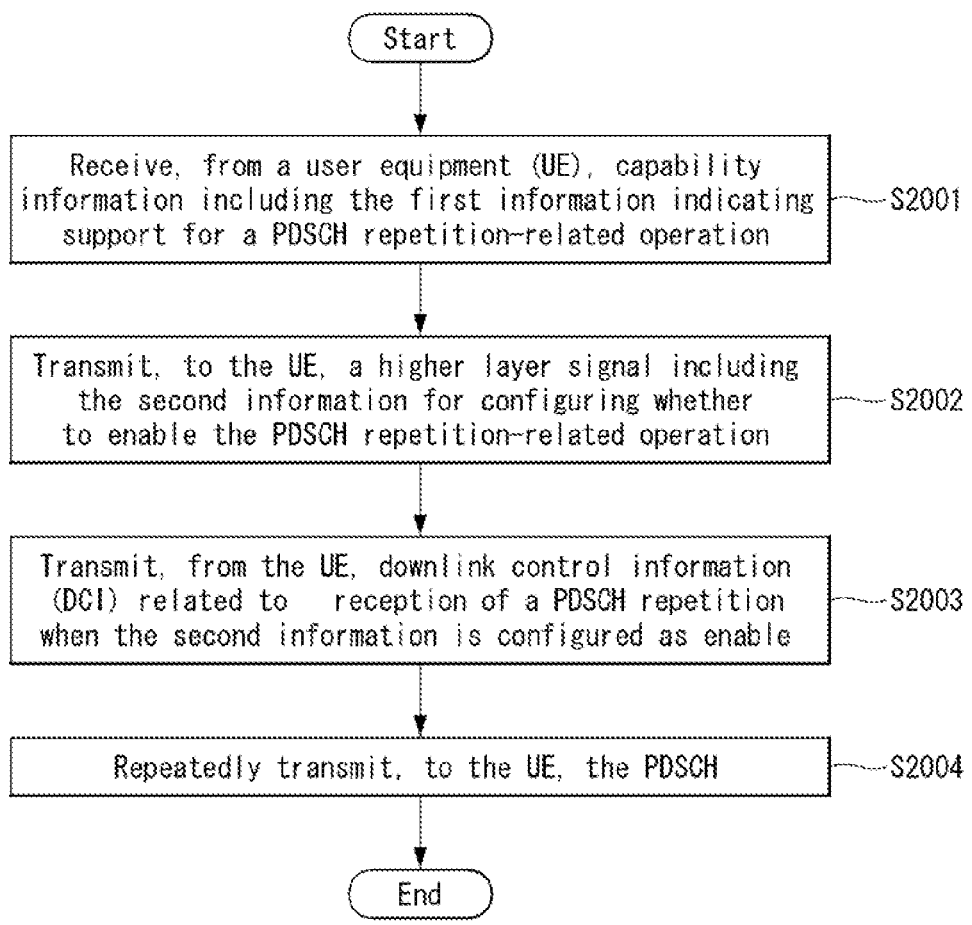

[FIG. 21]
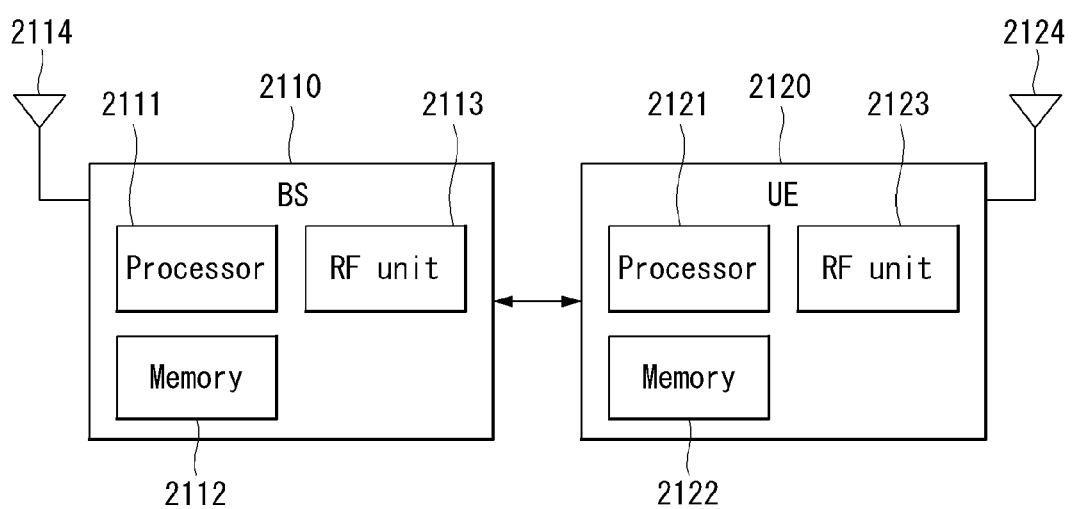

[FIG. 22]
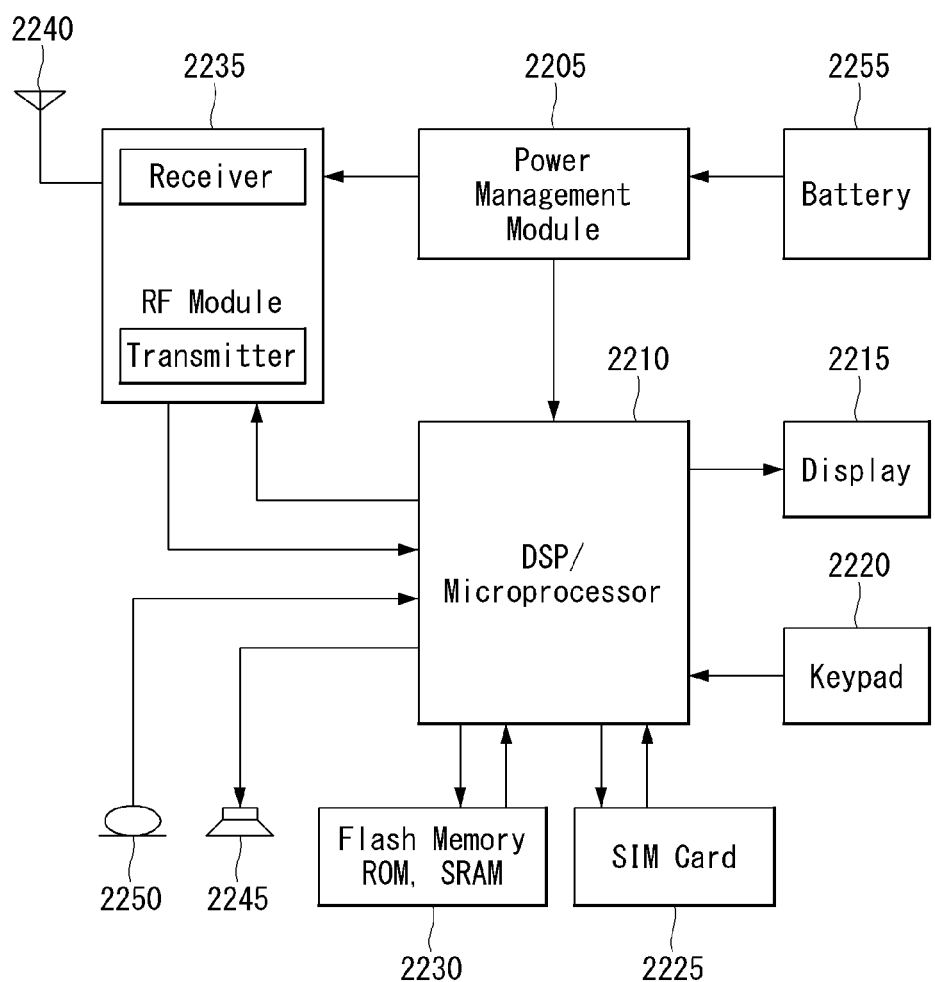

[FIG. 23]
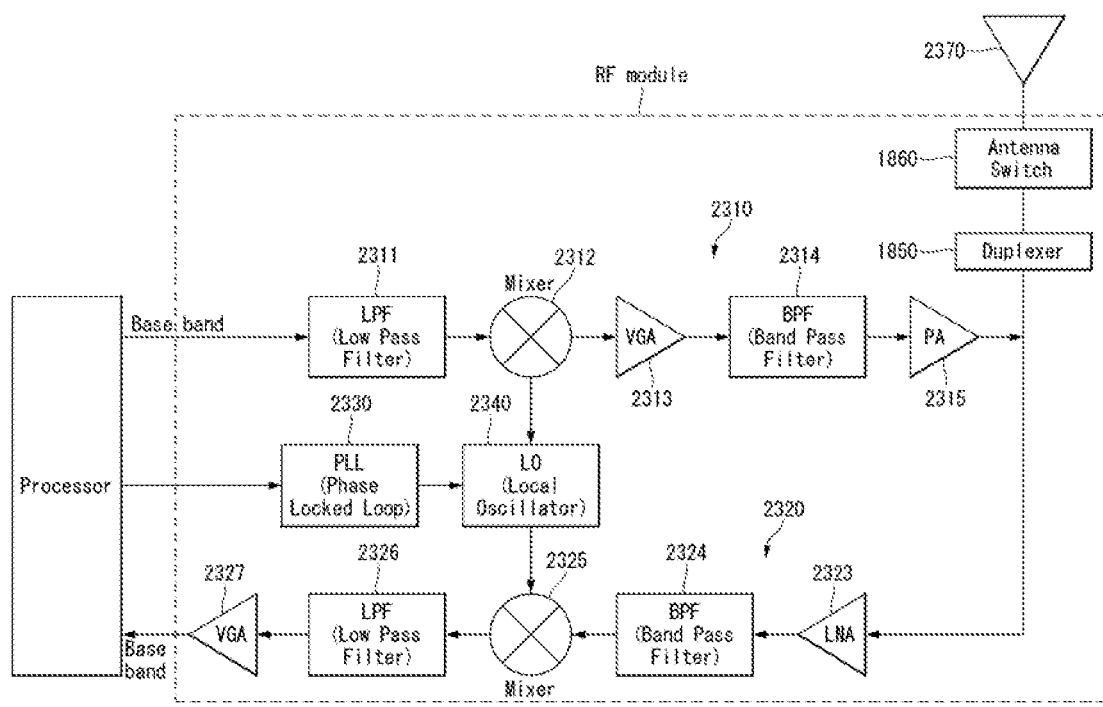

[FIG. 24]
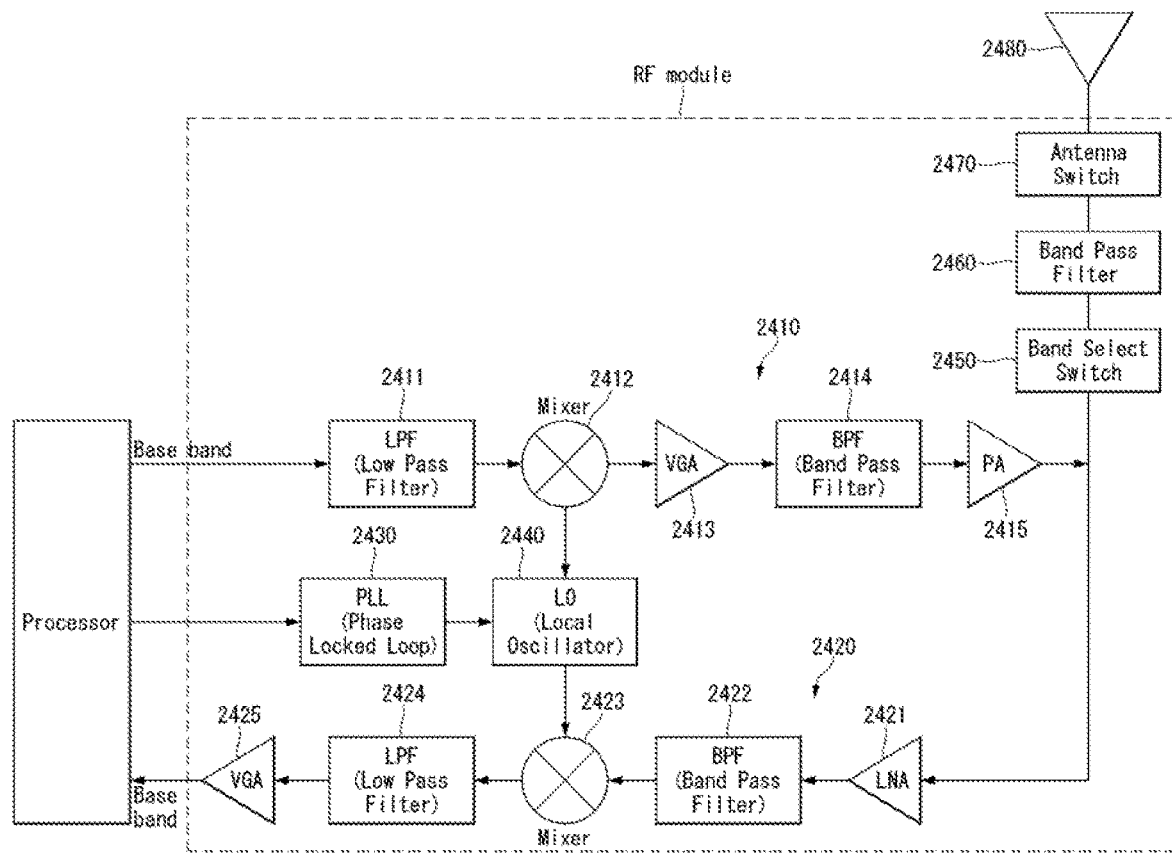

METHOD FOR TRANSMITTING AND RECEIVING PHYSICAL DOWNLINK SHARED CHANNEL IN WIRELESS COMMUNICATION SYSTEM AND DEVICE SUPPORTING SAME

CROSS-REFERENCE TO RELATED APPLICATIONS

This application is a continuation of International Application No. PCT/KR2019/004594, filed on Apr. 16, 2019, which claims the benefit of earlier filing date and right of priority to U.S. Provisional Application No. 62/658,512, filed on Apr. 16, 2018, 62/659,095, filed on Apr. 17, 2018, 62/659,674, filed on Apr. 18, 2018, and 62/664,257, filed on Apr. 29, 2018, the contents of which are all hereby incorporated by reference herein in their entirety.

TECHNICAL FIELD

The present invention relates to a wireless communication system and, more particularly, to a method for transmitting and/or reporting a UE's support for repetition of a physical downlink shared channel and an apparatus supporting the method.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An object of the present specification is to improve reliability of receiving a physical downlink shared channel by transmitting and/or reporting a UE's support for repetition of the physical downlink shared channel.

Technical problems to be solved by the present invention are not limited by the above-mentioned technical problems, and other technical problems which are not mentioned above can be clearly understood from the following description by those skilled in the art to which the present invention pertains.

Technical Solution

The present disclosure proposes a method of receiving a Physical Downlink Shared Channel (PDSCH) in a wireless communication system. A method performed by a user equipment (UE) may comprise transmitting, to a base station (BS), capability information including first information indicating support for a PDSCH repetition-related operation; receiving, from the BS, a higher layer signal including second information for configuring whether to enable the PDSCH repetition-related operation; receiving, from the BS, Downlink Control Information (DCI) related to reception of a PDSCH repetition when the second information is configured as enable; and repeatedly receiving, from the BS the PDSCH based on the DCI.

Also, in the method of the present disclosure, the capability information may further include information indicating whether configuration of the number of symbols of a control region through the higher layer signal is supported.

Also, in the method of the present disclosure, the first information may be transmitted when configuration of the number of symbols of a control region through the higher layer signal is supported.

Also, in the method of the present disclosure, the first information may indicate whether subframe repetition is supported.

Also, in the method of the present disclosure, the first information may include information indicating whether subframe repetition is supported, information indicating whether slot repetition is supported, and information indicating whether subslot repetition is supported, respectively.

Also, in the method of the present disclosure, the PDSCH repetition-related operation may be an HARQ-less/blind PDSCH repetition operation.

Also, a user equipment (UE) receiving a Physical Downlink Shared Channel (PDSCH) in a wireless communication system may comprise a transceiver transmitting and receiving a wireless signal; and a processor functionally connected to the transceiver wherein the processor controls the UE to transmit, to a BS, capability information including first information indicating support for a PDSCH repetition-related operation; to receive, from the BS, a higher layer signal including second information for configuring whether to enable the PDSCH repetition-related operation; if the second information is configured as enable, to receive, from the BS, Downlink Control Information (DCI) related to reception of a PDSCH repetition; and to repeatedly receive, from the BS, the PDSCH based on the DCI.

Also, in the UE of the present disclosure, the capability information may further include information indicating whether configuration of the number of symbols of a control region through the higher layer signal is supported.

Also, in the UE of the present disclosure, the first information may be transmitted when configuration of the number of symbols of a control region through the higher layer signal is supported.

Also, in the UE of the present disclosure, the first information may indicate whether subframe repetition is supported.

Also, in the UE of the present disclosure, the first information may include information indicating whether subframe repetition is supported, information indicating whether slot repetition is supported, and information indicating whether subslot repetition is supported, respectively.

Also, in the UE of the present disclosure, the PDSCH repetition-related operation may be an HARQ-less/blind PDSCH repetition operation.

Also, a base station (BS) transmitting a Physical Downlink Shared Channel (PDSCH) in a wireless communication system may comprise a transceiver transmitting and receiving a wireless signal; and a processor functionally connected to the transceiver wherein the processor controls the BS to receive, from a user equipment (UE), capability information including first information indicating support for a PDSCH repetition-related operation; to transmit, to the UE, a higher layer signal including second information for configuring whether to enable the PDSCH repetition-related operation; to transmit, to the UE, Downlink Control Information (DCI) related to reception of a PDSCH repetition when the second information is configured as enable; and repeatedly to transmit, to the UE, the PDSCH.

Also, in the BS of the present disclosure, the capability information may further include information indicating whether configuration of the number of symbols of a control region through the higher layer signal is supported.

Also, in the BS of the present disclosure, the first information may be received when configuration of the number of symbols of a control region through the higher layer signal is supported.

Advantageous Effects

The present disclosure provides an effect of improving reliability of receiving a physical downlink shared channel by transmitting and/or reporting a UE's support for repetition of the physical downlink shared channel.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

FIG. 1 illustrates a structure of a radio frame in a wireless communication system to which the present invention is applicable.

FIG. 2 illustrates a resource grid for one downlink slot in a wireless communication system to which the present invention is applicable.

FIG. 3 illustrates a structure of a downlink subframe in a wireless communication system to which the present invention is applicable.

FIG. 4 illustrates a structure of an uplink subframe in a wireless communication system to which the present invention is applicable.

FIG. 5 illustrates an example of an overall structure of a NR system to which a method proposed by the present specification is applicable.

FIG. 6 illustrates a relation between an uplink frame and a downlink frame in a wireless communication system to which a method proposed by the present specification is applicable.

FIG. 7 illustrates an example of a frame structure in a NR system.

FIG. 8 illustrates an example of a resource grid supported in a wireless communication system to which a method proposed by the present specification is applicable.

FIG. 9 illustrates examples of a resource grid per antenna port and numerology to which a method proposed by the present specification is applicable.

FIG. 10 illustrates an example of a self-contained structure to which a method proposed by the present specification is applicable.

FIG. 11 illustrates an example in which physical uplink control channel (PUCCH) formats are mapped to PUCCH regions of uplink physical resource blocks in a wireless communication system to which the present invention is applicable.

FIG. 12 illustrates a structure of channel quality indicator (CQI) channel in case of a normal cyclic prefix (CP) in a wireless communication system to which the present invention is applicable.

FIG. 13 illustrates a structure of ACK/NACK channel in case of a normal CP in a wireless communication system to which the present invention is applicable.

FIG. 14 illustrates an example of transport channel processing of an uplink shared channel (UL-SCH) in a wireless communication system to which the present invention is applicable.

FIG. 15 illustrates an example of signal processing of an uplink shared channel that is a transport channel in a wireless communication system to which the present invention is applicable.

FIG. 16 illustrates an example of generating and transmitting 5 SC-FDMA symbols during one slot in a wireless communication system to which the present invention is applicable.

FIG. 17 illustrates an ACK/NACK channel structure for PUCCH format 3 with a normal CP.

FIG. 18 illustrates a problem of reliability reduction in a PDSCH repetition operation.

FIG. 19 is a flow diagram illustrating an operation method of a UE according to the present specification.

FIG. 20 is a flow diagram illustrating an operation method of an base station according to the present specification.

FIG. 21 illustrates a block diagram of a wireless communication device to which methods proposed in the present specification may be applied.

FIG. 22 illustrates a block diagram of a communication device according to one embodiment of the present disclosure.

FIG. 23 illustrates one example of an RF module of a wireless communication device to which methods proposed in the present specification may be applied.

FIG. 24 illustrates another example of an RF module of a wireless communication device to which methods proposed in the present specification may be applied.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Overview of System

FIG. 1 illustrates a structure of a radio frame in a wireless communication system to which the present invention is applicable.

3GPP LTE/LTE-A supports radio frame structure type 1 applicable to frequency division duplex (FDD) and radio frame structure Type 2 applicable to time division duplex (TDD).

In FIG. 1, the size of a radio frame in a time domain is represented as a multiple of a time unit of $T\_s=1/(15000*2048)$. Downlink and uplink transmissions are organized into radio frames with a duration of $T\_f=307200*T\_s=10$ ms.

FIG. 1(a) illustrates radio frame structure type 1. The radio frame structure type 1 is applicable to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1(b) illustrates frame structure type 2.

The radio frame type 2 consists of two half-frames of $153600*T\_s=5$ ms length each. Each half-frame consists of five subframes of $30720*T\_s=1$ ms length.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of T_slot=15360*T_s=0.5 ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame according to an example of FIG. 1 is merely an example, and the number of subcarriers included in a radio frame, the number of slots included in a subframe, and the number of OFDM symbols included in a slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 a downlink shared channel (DL-SCH), resource allocation information (also referred to as an uplink grant) of an uplink shared channel (UL-SCH), paging information in a paging channel (PCH), system information in the DL-SCH, resource allocation for an upper-layer (higher-layer) control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling, etc.).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

The following invention proposed by the present specification can be applied to a 5G NR system (or device) as well as a LTE/LTE-A system (or device).

Communication of the 5G NR system is described below with reference to FIGS. 5 to 10.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the present invention can be supported by standard documents disclosed in at least one of IEEE 802, 3GPP, and 3GPP2 which are the wireless access systems. That is, steps or parts in embodiments of the present invention which are not described to clearly show the technical spirit of the present invention can be supported by the standard documents. Further, all terms disclosed in the present disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the present specification, for convenience of explanation, the next generation radio access technology is referred to as NR (new RAT, radio access technology), and a wireless communication system to which the NR is applied is referred to as an NR system.

Definition of NR System Related Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

FIG. 5 illustrates an example of an overall structure of a NR system to which a method proposed by the present specification is applicable.

Referring to FIG. 5, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In a NR system, multiple numerologies can be supported. A numerology may be defined by a subcarrier spacing and a cyclic prefix (CP) overhead. Multiple subcarrier spacings can be derived by scaling a basic subcarrier spacing by an integer N (or $\mu$). Further, although it is assumed not to use a very low subcarrier spacing at a very high carrier frequency, the numerology used can be selected independently of a frequency band.

In the NR system, various frame structures according to the multiple numerologies can be supported.

Hereinafter, an orthogonal frequency division multiplexing (OFDM) numerology and a frame structure which may be considered in the NR system will be described.

Multiple OFDM numerologies supported in the NR system may be defined as in Table 3.

TABLE 3

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In regard to a frame structure in the NR system, a size of various fields in a time domain is expressed as a multiple of a time unit of $T_s=1/(\Delta f_{max} \cdot N_f)$, where $\Delta f_{max}=480 \cdot 10^3$ and $N_f=4096$. Downlink and uplink transmissions are organized into radio frames with a duration of $T_f=(\Delta f_{max} N_f/100) \cdot T_s=10$ ms. Here, the radio frame consists of ten subframes each having a duration of $T_{sf}=(\Delta f_{max} N_f/1000) \cdot T_s=1$ ms. In this case, there may be a set of frames in the uplink and a set of frames in the downlink. FIG. 6 illustrates a relation between an uplink frame and a downlink frame in a wireless communication system to which a method proposed by the present specification is applicable.

As illustrated in FIG. 6, uplink frame number i for transmission from a user equipment (UE) shall start $T_{TA}=N_{TA}T_s$ before the start of a corresponding downlink frame at the corresponding UE.

Regarding the numerology $\mu$, slots are numbered in increasing order of $n_s^{\mu} \in \{0, \ldots, N_{subframe}^{slots,\mu}-1\}$ within a subframe and are numbered in increasing order of $n_{s,f}^{\mu} \in \{0, \ldots, N_{frame}^{slots,\mu}-1\}$ within a radio frame. One slot consists of consecutive OFDM symbols of $N_{symb}^{\mu}$, and $N_{symb}^{\mu}$ is determined depending on a numerology used and slot configuration. The start of slots $n_s^{\mu}$ in a subframe is aligned in time with the start of OFDM symbols $n_s^{\mu} N_{symb}^{\mu}$ in the same subframe.

Not all UEs are able to transmit and receive at the same time, and this means that not all OFDM symbols in a downlink slot or an uplink slot are available to be used.

Table 4 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 5 represents the number of OFDM symbols per slot, the number of slots per radio frame, and the number of slots per subframe in an extended CP.

TABLE 4

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 7 illustrates an example of a frame structure in a NR system. FIG. 7 is merely for convenience of explanation and does not limit the scope of the present invention. In Table 5, in case of $\mu=2$, i.e., as an example in which a subcarrier spacing (SCS) is 60 kHz, one subframe (or frame) may include four slots with reference to Table 4, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 8 illustrates an example of a resource grid supported in a wireless communication system to which a method proposed by the present specification is applicable.

Referring to FIG. 8, a resource grid consists of $N_{RB}^{\mu} N_{sc}^{RB}$ subcarriers on a frequency domain, each subframe consisting of 14.2μ OFDM symbols, but the present invention is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 9, one resource grid may be configured per numerology μ and antenna port p.

FIG. 9 illustrates examples of a resource grid per antenna port and numerology to which a method proposed by the present specification is applicable.

Each element of the resource grid for the numerology μ and the antenna port p is called a resource element and is uniquely identified by an index pair (k,l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWPi}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 10 illustrates an example of a self-contained structure to which a method proposed by the present specification is applicable. FIG. 10 is merely for convenience of explanation and does not limit the scope of the present invention.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In regard to the time gap, if uplink transmission is performed after downlink transmission in the self-contained slot, some OFDM symbol(s) may be configured as a guard period (GP).

Physical Uplink Control Channel (PUCCH)

Uplink control information (UCI) transmitted on a PUCCH may include scheduling request (SR), HARQ ACK/NACK information, and downlink channel measurement information.

The HARQ ACK/NACK information may be produced depending on whether decoding of downlink data packet on a PDSCH is successful or not. In the existing wireless communication system, one ACK/NACK bit is transmitted in case of single codeword downlink transmission while two ACK/NACK bits are transmitted in case of two codeword downlink transmissions.

The channel measurement information refers to feedback information related to a multiple input multiple output (MIMO) scheme and may include a channel quality indicator (CQI), a precoding matrix index (PMI), and a rank indicator (RI). The channel measurement information may collectively be referred to as a CQI.

20 bits per subframe may be used for the CQI transmission.

The PUCCH may be modulated by using a binary phase shift keying (BPSK) scheme and a quadrature phase shift keying (QPSK) scheme. Control information for a plurality of UEs may be transmitted on the PDCCH. In case of performing code division multiplexing (CDM) to distinguish signals of the respective UEs, a length-12 constant amplitude zero autocorrelation (CAZAC) sequence is mostly used. Since the CAZAC sequence has characteristics of maintaining a predetermined amplitude in a time domain and a frequency domain, the CAZAC has properties suitable to increase coverage by reducing a peak-to-average power ratio (PAPR) or a cubic metric (CM) of the UE. In addition, the ACK/NACK information for downlink data transmission transmitted on the PDCCH is covered by using an orthogonal sequence or an orthogonal cover (OC).

Further, control information transmitted on the PUCCH may be distinguished using a cyclically shifted sequence each having a different cyclic shift (CS) value. The cyclically shifted sequence may be produced by cyclically shifting a base sequence by as much as a specific cyclic shift (CS) amount. The specific CS amount is indicated by a CS index. The number of available cyclic shifts may vary depending on the delay spread of a channel. Various kinds of sequences may be used as the base sequence, and the CAZAC sequence described above is an example.

An amount of control information that the UE can transmit in one subframe may be determined depending on the number of SC-FDMA symbols (i.e., SC-FDMA symbols except SC-FDMA symbols used for reference signal (RS) transmission for coherent detection of the PUCCH), that can be used in the transmission of the control information.

In the 3GPP LTE system, the PUCCH is defined as a total of seven different formats depending on transmitted control information, a modulation scheme, an amount of control information, etc., and attributes of uplink control information (UCI) transmitted according to each PUCCH format may be summarized as in the following Table 6.

TABLE 6

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for single transmission of SR. In case of single transmission of SR, an unmodulated waveform is applied, which will be described below in detail. PUCCH format 1a or 1b is used for transmission of HARQ ACK/NACK. In case of single transmission of HARQ ACK/NACK in a random subframe, PUCCH format 1a or 1b may be used. Alternatively, the HARQ ACK/NACK and the SR may be transmitted in the same subframe using the PUCCH format 1a or 1b.

PUCCH format 2 is used for transmission of a CQI, and PUCCH format 2a or 2b is used for transmission of the CQI and the HARQ ACK/NACK.

In case of an extended CP, the PUCCH format 2 may also be used for transmission of the CQI and the HARQ ACK/NACK.

FIG. 11 illustrates an example in which PUCCH formats are mapped to PUCCH regions of uplink physical resource blocks in a wireless communication system to which the present invention is applicable.

In FIG. 11, $N_{RB}^{UL}$ represents the number of resource blocks in the uplink, and $0, 1, \ldots, N_{RB}^{UL}-1$ refers to No. of s physical resource block. Basically, the PUCCH is mapped to both edges of an uplink frequency block. As illustrated in FIG. 11, the PUCCH format 2/2a/2b is mapped to a PUCCH region marked by m=0, 1, which may represent that the PUCCH format 2/2a/2b is mapped to resource blocks located at band edges. In addition, the PUCCH format 2/2a/2b and the PUCCH format 1/1a/1b are mixedly mapped to the PUCCH region marked by m=2. Next, the PUCCH format 1/1a/1b may be mapped to a PUCCH region marked by m=3, 4, 5. The number $N_{RB}^{(2)}$ of PUCCH RBs available for use by the PUCCH format 2/2a/2b may be indicated to the UEs in a cell by broadcasting signaling.

The PUCCH format 2/2a/2b is described. The PUCCH format 2/2a/2b is a control channel used to transmit channel measurement feedbacks CQI, PMI, and RI.

A periodicity and a frequency unit (or a frequency resolution) to be used to report the channel measurement feedback (hereinafter, collectively referred to as CQI information) may be controlled by the base station. Periodic CQI reporting and aperiodic CQI reporting in a time domain can be reported. The PUCCH format 2 may be used for the periodic CQI reporting only, and the PUSCH may be used for the aperiodic CQI reporting. In case of the aperiodic CQI reporting, the base station may instruct the UE to send an individual CQI report embedded into a resource which is scheduled for uplink data transmission.

FIG. 12 illustrates a structure of CQI channel in case of a normal CP in a wireless communication system to which the present invention is applicable.

Among SC-FDMA symbols 0 to 6 of one slot, SC-FDMA symbols 1 and 5 (second and sixth symbols) may be used for transmission of demodulation reference signal (DMRS), and the CQI information may be transmitted in the remaining SC-FDMA symbols. In case of the extended CP, one SC-FDMA symbol (SC-FDMA symbol 3) is used for the DMRS transmission.

In the PUCCH format 2/2a/2b, the modulation by the CAZAC sequence is supported, and a QPSK modulated symbol is multiplied by the length-12 CAZAC sequence. A cyclic shift (CS) of the sequence is changed between symbols and slots. An orthogonal covering is used for the DMRS.

The reference signal (DMRS) is carried on two SC-FDMA symbols which are separated from each other at an interval of three SC-FDMA symbols among seven SC-FDMA symbols included in one slot, and the CQI information is carried on the remaining five SC-FDMA symbols. The use of two RSs in one slot is to support a high speed UE. Further, the respective UEs are distinguished using a cyclic shift (CS) sequence. CQI information symbols are modulated and transmitted to all the SC-FDMA symbols, and the SC-FDMA symbol is composed of one sequence. That is, the UE modulates the CQI and transmits the modulated CQI to each sequence.

The number of symbols which can be transmitted in one TTI is 10, and the modulation of the CQI information is also determined up to the QPSK. Since a 2-bit CQI value can be carried in case of using the QPSK mapping for the SC-FDMA symbol, a 10-bit CQI value can be carried on one slot. Thus, a CQI value of maximum 20 bits can be carried in one subframe. A frequency domain spreading code is used to spread the CQI information in a frequency domain.

As the frequency domain spreading code, length-12 CAZAC sequence (e.g., ZC sequence) may be used. Each control channel may be distinguished by applying the CAZAC sequence having a different cyclic shift value. An IFFT is performed on frequency domain spreading CQI information.

The 12 equally-spaced cyclic shifts may allow 12 different UEs to be orthogonally multiplexed on the same PUCCH RB. In case of a normal CP, a DMRS sequence on the SC-FDMA symbol 1 and 5 (on the SC-FDMA symbol 3 in case of an extended CP) is similar to a CQI signal sequence on the frequency domain, but the modulation like the CQI information is not applied.

The UE may be semi-statically configured by higher layer signaling to report periodically different CQI, PMI, and RI types on PUCCH resources indicated as PUCCH resource indexes ($n_{PUCCH}^{(1,\tilde{p})}$, $n_{PUCCH}^{(2,\tilde{p})}$, $n_{PUCCH}^{(3,\tilde{p})}$). Here, the PUCCH resource index ($n_{PUCCH}^{(2,\tilde{p})}$) is information indicating a PUCCH region used for the PUCCH format 2/2a/2b transmission and a cyclic shift (CS) value to be used.

PUCCH Channel Structure

PUCCH formats 1a and 1b are described.

In the PUCCH format 1a/1b, a symbol modulated using a BPSK or QPSK modulation scheme is multiplied by length-12 CAZAC sequence. For example, the result of multiplying length-N CAZAC sequence r(n) (where n=0, 1, 2, ..., N−1) by a modulation symbol d(0) is y(0), y(1), y(2), ..., y(N−1). The symbols y(0), y(1), y(2), ..., y(N−1) may be referred to as a block of symbols. After the CAZAC sequence is multiplied by the modulation symbol, the block-wise spreading using an orthogonal sequence is applied.

A length-4 Hadamard sequence is used for normal ACK/NACK information, and a length-3 discrete fourier transform (DFT) sequence is used for shortened ACK/NACK information and a reference signal.

A length-2 Hadamard sequence is used for the reference signal in case of an extended CP.

FIG. 13 illustrates a structure of ACK/NACK channel in case of a normal CP in a wireless communication system to which the present invention is applicable.

More specifically, FIG. 13 illustrates an example of a PUCCH channel structure for HARQ ACK/NACK transmission without CQI.

A reference signal (RS) is carried on three consecutive SC-FDMA symbols in the middle of seven SC-FDMA symbols included in one slot, and an ACK/NACK signal is carried on the remaining four SC-FDMA symbols.

In case of an extended CP, the RS may be carried on two consecutive symbols in the middle. The number and location of symbols used for the RS may vary depending on a control channel, and the number and location of symbols used for the ACK/NACK signal related may be changed accordingly.

Both 1-bit and 2-bit acknowledgement information (in a state of not being scrambled) may be expressed as a single HARQ ACK/NACK modulation symbol using the BPSK and QPSK modulation schemes, respectively. Positive acknowledgement (ACK) may be encoded as '1', and negative ACK (NACK) may be encoded as '0'.

When a control signal is transmitted in an allocated bandwidth, two-dimensional spreading is applied to increase a multiplexing capacity. That is, frequency domain spreading and time domain spreading are simultaneously applied to increase the number of UEs or the number of control channels that can be multiplexed.

In order to spread an ACK/NACK signal in the frequency domain, a frequency domain sequence is used as a base sequence. As the frequency domain sequence, a Zadoff-Chu (ZC) sequence which is a kind of CAZAC sequence may be used. For example, multiplexing of different UEs or different control channels can be applied by applying different cyclic shifts (CS) to the ZC sequence which is the base sequence. The number of CS resources supported in SC-FDMA symbols for PUCCH RBs for the HARQ ACK/NACK transmission is configured by a cell-specific higher layer signaling parameter $\Delta_{shift}^{PUCCH}$.

The frequency domain spreading ACK/NACK signal is spread in a time domain using an orthogonal spreading code. A Walsh-Hadamard sequence or a DFT sequence may be used as the orthogonal spreading code. For example, the ACK/NACK signal may be spread using length-4 orthogonal sequences (w0, w1, w2, w3) for four symbols. An RS is also spread through length-3 or length-2 orthogonal sequence. This is referred to as orthogonal covering (OC).

As described above, multiple UEs may be multiplexed in a code division multiplexing (CDM) method using CS resources in the frequency domain and OC resources in the time domain. That is, ACK/NACK information and a RS of a large number of UEs may be multiplexed on the same PUCCH RB.

As to the time domain spreading CDM, the number of spreading codes supported for the ACK/NACK information is limited by the number of RS symbols. That is, since the number of SC-FDMA symbols for RS transmission is less than the number of SC-FDMA symbols for ACK/NACK information transmission, a multiplexing capacity of the RS is less than a multiplexing capacity of the ACK/NACK information.

For example, in case of the normal CP, the ACK/NACK information may be transmitted on four symbols, and not four but three orthogonal spreading codes may be used for the ACK/NACK information. This is because the number of RS transmission symbols is limited to three, and three orthogonal spreading codes only may be used for the RS.

If three symbols in one slot are used for the RS transmission and four symbols are used for the ACK/NACK information transmission in a subframe of the normal CP, for example, if six cyclic shifts (CSs) in the frequency domain and three orthogonal covering (OC) resources in the time domain can be used, HARQ acknowledgement from a total of 18 different UEs may be multiplexed within one PUCCH RB. If two symbols in one slot are used for the RS transmission and four symbols are used for the ACK/NACK information transmission in a subframe of the extended CP, for example, if six cyclic shifts (CSs) in the frequency domain and two orthogonal covering (OC) resources in the time domain can be used, HARQ acknowledgement from a total of 12 different UEs may be multiplexed in one PUCCH RB.

Next, the PUCCH format 1 is described. A scheduling request (SR) is transmitted in such a manner that the UE is requested to be scheduled or is not request. A SR channel reuses an ACK/NACK channel structure in the PUCCH format 1a/1b, and is configured in an on-off keying (OOK) method based on an ACK/NACK channel design. In the SR channel, a reference signal is not transmitted. Thus, length-7 sequence is used in the normal CP, and length-6 sequence is used in the extended CP. Different cyclic shifts or orthogonal covers may be allocated for the SR and the ACK/NACK. That is, the UE transmits HARQ ACK/NACK on resources allocated for the SR for the purpose of positive SR transmission. The UE transmits HARQ ACK/NACK on resources allocated for the ACK/NACK for the purpose of negative SR transmission.

Next, an enhanced-PUCCH (e-PUCCH) format is described. The e-PUCCH format may correspond to PUCCH format 3 of the LTE-A system. A block spreading scheme may be applied to the ACK/NACK transmission using the PUCCH format 3.

PUCCH Piggybacking in Rel-8 LTE

FIG. 14 illustrates an example of transport channel processing of an UL-SCH in a wireless communication system to which the present invention is applicable.

In the 3GPP LTE system (=E-UTRA, Rel. 8), in case of the UL, for efficient utilization of a power amplifier of a terminal, peak-to-average power ratio (PAPR) characteristics or cubic metric (CM) characteristics that affect a performance of the power amplifier are configured so that good single carrier transmission is maintained. That is, in the existing LTE system, the good single carrier characteristics can be maintained by maintaining single carrier characteristics of data to be transmitted through DFT-precoding in case of the PUSCH transmission, and transmitting information carried on a sequence with the single carrier characteristic in case of the PUCCH transmission. However, when DFT-precoded data is non-consecutively allocated to a frequency axis or the PUSCH and the PUCCH are simultaneously transmitted, the single carrier characteristics are degraded. Thus, as illustrated in FIG. 8, when the PUSCH is transmitted in the same subframe as the PUCCH transmission, uplink control information (UCI) to be transmitted to the PUCCH for the purpose of maintaining the single carrier characteristics is transmitted (piggyback) together with the data via the PUSCH.

As described above, because the PUCCH and the PUSCH cannot be simultaneously transmitted in the existing LTE terminal, the existing LTE terminal uses a method that multiplexes uplink control information (UCI) (CQI/PMI, HARQ-ACK, RI, etc.) to the PUSCH region in a subframe in which the PUSCH is transmitted.

For example, when a channel quality indicator (CQI) and/or a precoding matrix indicator (PMI) needs to be transmitted in a subframe allocated to transmit the PUSCH, UL-SCH data and the CQI/PMI are multiplexed before DFT-spreading to transmit both control information and data. In this case, the UL-SCH data performs rate-matching considering CQI/PMI resources. Further, a scheme is used, in which control information such as HARQ ACK and RI punctures the UL-SCH data and is multiplexed to the PUSCH region.

FIG. 15 illustrates an example of signal processing of an uplink shared channel that is a transport channel in a wireless communication system to which the present invention is applicable.

Hereinafter, signal processing of an uplink shared channel (hereinafter, referred to as "UL-SCH") may be applied to one or more transport channels or control information types.

Referring to FIG. 15, the UL-SCH transfers data to a coding unit in the form of a transport block (TB) once every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block transferred from the upper layer (higher layer). In this instance, A denotes a size of the transport block, and L denotes the number of parity bits. Input bits, to which the CRC is attached, are denoted by $b_0, b_1, b_2, b_3, \ldots, b_{B-1}$. In this instance, B denotes the number of bits of the transport block including the CRC.

$b_0, b_1, b_2, b_3, \ldots, b_{B-1}$ are segmented into multiple code blocks (CBs) according to the size of the TB, and the CRC is attached to the multiple segmented CBs. Bits after the code block segmentation and the CRC attachment are denoted by $c_{r0}, c_{r1}, c_{r2}, c_{r3}, \ldots, c_{r(K_r-1)}$. Here, r represents No. (r=0, ..., C−1) of the code block, and Kr represents the number of bits depending on the code block r. Further, C represents the total number of code blocks.

Subsequently, channel coding is performed. Output bits after the channel coding are denoted by $d_{r0}^{(i)}, d_{r1}^{(i)}, d_{r2}^{(i)}, d_{r3}^{(i)}, \ldots, d_{r(D_r-1)}^{(i)}$. In this instance, i represents a coded stream index and may have a value of 0, 1, or 2. Dr represents the number of bits of an i-th coded stream for a code block r. r represents a code block number (r=0, ..., C−1), and C represents the total number of code blocks. Each code block may be coded by turbo coding.

Subsequently, rate matching is performed. Bits after the rate matching are denoted by $e_{r0}, e_{r1}, e_{r2}, e_{r3}, \ldots, e_{r(E_r-1)}$. In this case, r represents the code block number (r=0, ..., C−1), and C represents the total number of code blocks. Er represents the number of rate-matched bits of a r-th code block.

Subsequently, concatenation between the code blocks is performed again. Bits after the concatenation of the code blocks is performed are denoted by $f_0, f_1, f_2, f_3, \ldots, f_{G-1}$. In this instance, G represents the total number of bits coded for transmission, and when the control information is multiplexed with the UL-SCH, the number of bits used for the transmission of the control information is not included.

When the control information is transmitted on the PUSCH, channel coding of CQI/PMI, RI, and ACK/NACK which are the control information is independently performed. Because different coded symbols are allocated for the transmission of each control information, each control information has a different coding rate.

In time division duplex (TDD), an ACK/NACK feedback mode supports two modes of ACK/NACK bundling and ACK/NACK multiplexing by higher layer configuration. ACK/NACK information bit for the ACK/NACK bundling consists of 1 bit or 2 bits, and ACK/NACK information bit for the ACK/NACK multiplexing consists of between 1 bit and 4 bits.

After the concatenation between the code blocks, coded bits $f_0, f_1, f_2, f_3, \ldots, f_{G-1}$ of the UL-SCH data and coded bits $q_0, q_1, q_2, q_3, \ldots, q_{N_L \cdot Q_{CQI}-1}$ of the CQI/PMI are multiplexed. The result of multiplexing the data and the CQI/PMI is denoted by $g_0, g_1, g_2, g_3, \ldots, g_{H'-1}$. In this instance, $g_i$ (i=0, ..., H'−1) represents a column vector with a length of $(Q_m \cdot N_L)$, $H=(G+N_L \cdot Q_{CQI})$, and $H'=H/(N_L \cdot Q_m)$. $N_L$ represents the number of layers mapped to a UL-SCH transport block, and H represents the total number of coded bits allocated, for the UL-SCH data and the CQI/PMI information, to $N_L$ transport layers to which the transport block is mapped.

Subsequently, multiplexed data and CQI/PMI, separately channel-coded RI, and ACK/NACK are channel-interleaved to generate an output signal.

PDCCH Assignment Procedure

A plurality of PDCCHs may be transmitted within one subframe. That is, a control region of one subframe consists of a plurality of CCEs having indexes 0 to $N_{CCE,k}-1$, where $N_{CCE,k}$ denotes the total number of CCEs in a control region of a k-th subframe. The UE monitors a plurality of PDCCHs in every subframe. Here, the monitoring means that the UE attempts the decoding of each PDCCH depending on a monitored PDCCH format. The base station does not provide the UE with information about where the corresponding PDCCH is in a control region allocated in a subframe. Since the UE cannot know which position its own PDCCH is transmitted at which CCE aggregation level or DCI format in order to receive a control channel transmitted by the base station, the UE monitors a set of PDCCH candidates in the subframe and searches its own PDCCH. This is called blind decoding/detection (BD). The blind decoding refers to a method, by the UE, for de-masking its own UE identifier (UE ID) from a CRC part and then checking whether a corresponding PDCCH is its own control channel by reviewing a CRC error.

In an active mode, the UE monitors a PDCCH of each subframe in order to receive data transmitted to the UE. In a DRX mode, the UE wakes up in a monitoring interval of each DRX period and monitors a PDCCH in a subframe corresponding to the monitoring interval. A subframe in which the monitoring of the PDCCH is performed is called a non-DRX subframe.

The UE shall perform the blind decoding on all of CCEs present in a control region of the non-DRX subframe in order to receive the PDCCH transmitted to the UE. Since the UE does not know which PDCCH format will be transmitted, the UE shall decode all of PDCCHs at a possible CCE aggregation level until the blind decoding of the PDCCHs is successful within each non-DRX subframe. Since the UE does not know how many CCEs are used for the PDCCH for the UE, the UE shall attempt detection at all the possible CCE aggregation levels until the blind decoding of the PDCCH is successful. That is, the UE performs the blind decoding per CCE aggregation level. That is, the UE first attempts decoding by setting a CCE aggregation level unit to 1. If all the decoding fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts the blind decoding on a total of four of C-RNTI, P-RNTI, SI-RNTI, and RA-RNTI. The UE attempts blind decoding on all the DCI formats that need to be monitored.

As described above, if the UE performs blind decoding on all the possible RNTIs and all the DCI formats, that need to monitored, per each of all the CCE aggregation levels, the number of detection attempts excessively increases. Therefore, in the LTE system, a search space (SS) concept is defined for the blind decoding of the UE. The search space means a set of PDCCH candidates for monitoring, and may have a different size depending on each PDCCH format.

The search space may include a common search space (CSS) and a UE-specific/dedicated search space (USS). In the case of the common search space, all the UEs may be aware of the size of the common search space, but the UE-specific search space may be individually configured to each UE. Thus, the UE must monitor both the UE-specific search space and the common search space in order to decode the PDCCH, and thus performs blind decoding (BD) up to 44 times in one subframe. This does not include blind decoding performed based on a different CRC value (e.g., C-RNTI, P-RNTI, SI-RNTI, RA-RNTI).

There may occur a case where the base station cannot secure CCE resources for transmitting a PDCCH to all the UEs which intend to transmit the PDCCH within a given subframe due to a small search space. This is because resources left over after a CCE location is allocated may not be included in a search space of a specific UE. In order to minimize such a barrier that may continue even in a next subframe, a UE-specific hopping sequence may be applied to the point at which the UE-specific search space starts.

Table 7 represents the size of the common search space and the UE-specific search space.

TABLE 7

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for DCI formats 0 and 1A in the UE-specific search space. In this instance, the DCI formats 0 and 1A have the same size, but the UE may distinguish between the DCI formats using a flag for the DCI format 0/format 1A differentiation included in a PDCCH. Furthermore, DCI formats other than the DCI formats 0 and 1A may be required for the UE depending on a PDSCH transmission mode configured by the base station. For example, DCI formats 1, 1B and 2 may be used.

The UE in the common search space may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier not a UE-specific identifier.

A search space $S_k^{(L)}$ means a set of PDCCH candidates according to an aggregation level $L \in \{1,2,4,8\}$. A CCE according to a PDCCH candidate set m of the search space may be determined by the following Equation 3.

$$L \cdot \{(Y_k+m) \bmod \lfloor N_{CCE,k}/L \rfloor\}+i \quad \text{[Equation 3]}$$

Here, $M^{(L)}$ represents the number of PDCCH candidates according to a CCE aggregation level L for monitoring in the search space, and m=0, ..., $M^{(L)}$−1. i is an index for designating an individual CCE in each PDCCH candidate, where i=0, ..., L−1.

As described above, the UE monitors both the UE-specific search space and the common search space in order to decode the PDCCH. Here, the common search space (CSS) supports PDCCHs with an aggregation level of {4, 8}, and the UE-specific search space (USS) supports PDCCHs with an aggregation level of {1, 2, 4, 8}.

Table 8 represents DCCH candidates monitored by a UE.

TABLE 8

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 3, in case of the common search space, $Y_k$ is set to 0 with respect to two aggregation levels L=4 and L=8. On the other hand, in case of the UE-specific search space with respect to an aggregation level L, $Y_k$ is defined as in Equation 4

$$Y_k=(A \cdot Y_{k-1}) \mod D \quad \text{[Equation 4]}$$

Here, $Y_{-1}=n_{RNTI} \neq 0$, and an RNTI value used for $n_{RNTI}$ may be defined as one of identifications of the UE. Further, A=39827, D=65537, and $k=\lfloor n_s/2 \rfloor$, where $n_s$ denotes a slot number (or index) in a radio frame.

General ACK/NACK Multiplexing Method

In a situation in which a UE shall simultaneously transmit multiple ACKs/NACKs corresponding to multiple data units received from an eNB, an ACK/NACK multiplexing method based on PUCCH resource selection may be considered to maintain single-frequency characteristics of an ACK/NACK signal and reduce ACK/NACK transmission power.

Together with ACK/NACK multiplexing, contents of ACK/NACK responses for multiple data units are identified by combining a PUCCH resource and a resource of QPSK modulation symbols used for actual ACK/NACK transmission.

For example, if one PUCCH resource transmits 4 bits and up to four data units can be transmitted, an ACK/NACK result can be identified at the eNB as indicated in the following Table 9.

TABLE 9

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,2}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In the above Table 9, HARQ-ACK(i) represents an ACK/NACK result for an i-th data unit. In the above Table 9, discontinuous transmission (DTX) means that there is no data unit to be transmitted for the corresponding HARQ-ACK(i) or that the UE does not detect the data unit corresponding to the HARQ-ACK(i). According to the above Table 9, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided, and b(0) and b(1) are two bits transmitted by using a selected PUCCH.

For example, if the UE successfully receives all of four data units, the UE transmits 2-bit (1,1) using $n_{PUCCH,1}^{(1)}$.

If the UE fails in decoding in first and third data units and succeeds in decoding in second and fourth data units, the US transmits bits (1,0) using $n_{PUCCH,3}^{(1)}$.

In ACK/NACK channel selection, if there is at least one ACK, the NACK and the DTX are coupled with each other. This is because a combination of the reserved PUCCH resource and the QPSK symbol may not all ACK/NACK states. However, if there is no ACK, the DTX is decoupled from the NACK.

In this case, the PUCCH resource linked to the data unit corresponding to one definite NACK may also be reserved to transmit signals of multiple ACKs/NACKs.

General ACK/NACK Transmission

In the LTE-A system, it considers to transmit, via a specific UL component carrier (CC), a plurality of ACK/NACK information/signals for a plurality of PDSCHs transmitted via a plurality of DL CCs. To this end, unlike ACK/NACK transmission using PUCCH format 1a/1b in the existing Rel-8 LTE, it may consider to transmit a plurality of ACK/NACK information/signals by channel-coding (e.g., Reed-Muller code, Tail-biting convolutional code, etc.) a plurality of ACK/NACK information and then using PUCCH format 2 or a new PUCCH format (i.e., E-PUCCH format) of the following block spreading based modified type.

A block spreading scheme is a scheme for modulating control signal transmission using an SC-FDMA method, unlike the existing PUCCH format 1 series or 2 series. As illustrated in FIG. 8, a symbol sequence may be spread on a time domain using an orthogonal cover code (OCC) and may be transmitted. Control signals of a plurality of UEs may be multiplexed on the same RB using the OCC. In case of the PUCCH format 2 described above, one symbol sequence is transmitted over the time domain, and the control signals of the plurality of UEs are multiplexed using a cyclic shift (CS) of a CAZAC sequence. On the other hand, in case of the block spreading based PUCCH format (e.g., PUCCH format 3), one symbol sequence is transmitted over a frequency domain, and the control signals of the plurality of UEs are multiplexed using a time domain spreading using the OCC.

FIG. 16 illustrates an example of generating and transmitting 5 SC-FDMA symbols during one slot in a wireless communication system to which the present invention is applicable.

FIG. 16 illustrates an example of generating and transmitting five SC-FDMA symbols (i.e., data part) using an OCC of the length 5 (or SF=5) in one symbol sequence during one slot. In this case, two RS symbols may be used during one slot.

In the example of FIG. 16, the RS symbol may be generated from a CAZAC sequence, to which a specific cyclic shift value is applied, and may be transmitted in the form in which a predetermined OCC is applied (or multiplied) over a plurality of RS symbols. Further, in the example of FIG. 8, if it is assumed that 12 modulation symbols are used for each OFDM symbol (or SC-FDMA symbol) and each modulation symbol is generated by QPSK, the maximum number of bits which can be transmitted on one slot is 24 bits (=12×2). Thus, the number of bits which can be transmitted on two slots is a total of 48 bits. If a PUCCH channel structure of the block spreading scheme is used as described above, control information of an extended size can be transmitted as compared to the existing PUCCH format 1 series and 2 series.

For convenience of explanation, such a channel coding based method for transmitting a plurality of ACKs/NACKs using the PUCCH format 2 or the E-PUCCH format is referred to as a multi-bit ACK/NACK coding transmission method. The method refers to a method for transmitting an ACK/NACK coded block generated by channel-coding ACK/NACK information or discontinuous transmission (DTX) information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an ACK/NACK selection method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-ATDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an ACK-counter method which informs the total number of ACKs (or the number of some of the ACKs) per CC with respect to all PDSCHs or DL grant PDCCHs received for each CC). In this instance, a multi-bit ACK/NACK coding or an ACK/NACK selection based ACK/NACK transmission method may be configurably applied according to a size of an ACK/NACK payload per UE, i.e., a size of an ACK/NACK payload for full or bundled ACK/NACK transmission that is configured for each UE.

ACK/NACK Transmission for LTE-A

The LTE-A system supports transmitting, via a specific UL CC, a plurality of ACK/NACK information/signals for a plurality of PDSCHs which are transmitted via a plurality of DL CCs. To this end, unlike ACK/NACK transmission using PUCCH format 1a/1b in the existing Rel-8 LTE, a plurality of ACK/NACK information may be transmitted through a PUCCH format 3.

FIG. 17 illustrates an ACK/NACK channel structure for PUCCH format 3 with a normal CP.

As illustrated in FIG. 17, a symbol sequence is transmitted by time-domain spreading by an orthogonal cover code (OCC) and may multiplex control signals of multiple UEs on the same RB using the OCC. In the PUCCH format 2 mentioned above, one symbol sequence is transmitted over a time domain and performs the UE multiplexing using a cyclic shift of a CAZAC sequence. On the other hand, in case of the PUCCH format 3, one symbol sequence is transmitted over a frequency domain and performs the UE multiplexing using the time-domain spreading based on the OCC. FIG. 17 illustrates a method for generating and transmitting five SC-FDMA symbols from one symbol sequence using OCC of length-5 (spreading factor=5). In an example of FIG. 17, a total of two RS symbols have been used during one slot, but various applications including a method of using three RS symbols and using the OCC of spreading factor=4, etc. may be considered. Here, the RS symbol may be generated from a CAZAC sequence with a specific cyclic shift and may be transmitted in the form in which a specific OCC is applied (or multiplied) to a plurality of RS symbols of the time domain. In the example of FIG. 17, if it is assumed that 12 modulation symbols are used for each SC-FDMA symbol and each modulation symbol uses QPSK, the maximum number of bits which can be transmitted on each slot is 24 bits (=12×2). Thus, the number of bits which can be transmitted on two slots is a total of 48 bits.

For convenience of explanation, such a channel coding based method for transmitting a plurality of ACKs/NACKs using the PUCCH format 2 or the E-PUCCH format is referred to as a "multi-bit ACK/NACK coding" transmission method. The method refers to a method for transmitting an ACK/NACK coded block generated by channel-coding ACK/NACK information or DTX information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an "ACK/NACK selection" method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-ATDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an "ACK-counter" method which informs of the total number of ACKs (or the number of some ACKs) per CC for all PDSCHs or DL grant PDCCHs received for each CC). In this instance, a "multi-bit ACK/NACK coding" or an "ACK/NACK selection" based ACK/NACK transmission method may be configurably applied according to a size of an ACK/NACK payload per UE, i.e., a size of an ACK/NACK payload for the full or bundled ACK/NACK transmission that is configured for each UE.

The next-generation wireless communication system requires a large frequency band and aims to support various services or requirements. As one example, among New Radio (NR) requirements of the 3GPP, Ultra Reliable and Low Latency Communication (URLLC), one of representative scenarios, may require a low latency and high reliability requirement that user plane latency is within 0.5 ms and transmission of X bytes is performed with less than $10^{-5}$ error rate.

Also, in contrast to enhanced Mobile BroadBand (eMBB) which requires a large traffic capacity, traffic of URLLC is characterized that it occurs sporadically and a file size ranges from tens to hundreds of bytes.

Therefore, while eMBB requires that transmission rate is maximized and overhead of control information is minimized, URLLC requires a short scheduling time unit and a reliable transmission method.

A reference time unit assumed and/or used for transmission and reception of a physical channel may be set to various values according to an application area or type of traffic. The reference time may be a default unit for scheduling a specific physical channel. The reference time unit may be varied according to the number of symbols constituting the corresponding scheduling unit and/or subcarrier spacing.

For the convenience of descriptions, the present specification uses a slot and a mini-slot as the reference time unit. For example, a slot may be the default scheduling unit used for general data traffic (for example, eMBB).

A mini-slot may have a shorter time interval in the time domain than the slot. A mini-slot may be the default scheduling unit used for more special purpose traffic or communication schemes (for example, URLLC, unlicensed band or millimeter wave).

However, the specific assumption above is only an example, and it should be clearly understood that the proposed methods of the present specification may be modified and applied even to the case where eMBB transmits and receives a physical channel by using a mini-slot and/or the case where URLLC or other communication scheme transmits and receives a physical channel by using a slot.

In what follows, the present specification reinterprets existing fields and proposes a method (hereinafter, a first embodiment) for indicating information related to repetition of a Physical Downlink Shared Channel (PDSCH), a method (hereinafter, a second embodiment) for interpreting CFI according to support for a PDSCH repetition-related operation, a method (hereinafter, a third embodiment) for determining PUCCH resources for transmitting an HARQ-ACK, a method (hereinafter, a fourth embodiment) for reporting whether PDSCH decoding with respect to a specific TTI within a predetermined time period is supported, a method (hereinafter, a fifth embodiment) for indicating and/or configuring whether to report an HARQ-ACK with respect to a PDSCH, a method (hereinafter, a sixth embodiment) for configuring and/or reporting whether an operation for supporting specific latency and/or reliability requirements is supported, a method (hereinafter, a seventh embodiment) for improving reliability of reception of a PDSCH repetition in the occurrence of a TTI in which a PDSCH repetition operation is unable to transmit downlink data, and a method (hereinafter, an eighth embodiment) for determining and/or configuring whether to allow DL DMRS sharing in a TTI over a plurality of contiguous subframes.

In what follows, embodiments described in the present specification are distinguished from each other only in an attempt for the convenience of descriptions, and it should be clearly understood that part of a method and/or structure of a particular embodiment may be substituted by a method and/or structure of another embodiment or may be applied in a combination thereof.

Also, in what follows, terms like slot, subframe, and frame used in the embodiments described in the present specification may correspond to specific examples of particular time units used in a wireless communication system. In other words, in applying the methods proposed in the present specification, the time unit may be replaced with a different time unit applied to another wireless communication system.

First Embodiment

Now, described will be a method for indicating information related to repetition of a Physical Downlink Shared Channel (PDSCH) by reinterpreting existing fields.

To improve transmission reliability of a PDSCH, a method for transmitting the same transport block (TB)

repeatedly over a plurality of Transmission Time Intervals (TTIs) instead of transmitting a Hybrid Automatic Repeat and request-Acknowledgement (HARQ-ACK) (namely, blind/HARQ-less PDSCH repetition) may be considered. The repetition of the same TB may be scheduled by indicating the number of repetitions in the Downlink Control Information (DCI). Similarly, repetition of the same TB may be scheduled by configuring the number of repetitions through higher layer signaling. Further, the repetition of the same TB may be scheduled by using the same HARQ process ID and/or non-toggled New Data Indicator (NDI) with respect to (contiguous) TTIs or TTIs (within predetermined time duration).

The transmission performance of a PDSCH may depend on how accurately a PDCCH is decoded. This is so because, if decoding of a PDCCH fails, it is also actually impossible to decode a PDSCH that schedules the decoding of a PDCCH.

To perform the repetition operation, a method for adding a DCI field may be taken into account. However, it may not be preferable since the method increases the payload of a PDCCH and as a result, PDCCD decoding performance may be degraded. Therefore, to avoid degradation of PDCCH decoding performance and/or avoid attempting additional blind decoding (BD), it may be preferable to maintain an existing DCI format size.

Therefore, as an example, a rule may be defined, agreed on and/or configured so that whether to repeat the PDSCH and/or information related to the number of repetitions may be indicated by using the fields such as HARQ process ID, Redundancy Version (RV), NDI, Transmit Power Control (TPC) command, Downlink Assignment Index (DAI) and/or Acknowledgement Resource Indicator (ARI). In other words, a rule may be defined, agreed on and/or configured so that part of the fields are reinterpreted to indicate whether to repeat the PDSCH and/or information related to the number of repetitions without addition of a field to the existing DCI format and/or without size change (and/or without an additional BD configuration with respect to the existing BD). Here, reinterpretation may mean interpreting a specific field value as a value related to whether to repeat the PDSCH and/or the number of repetitions of the PDSCH.

Here, HARQ process ID, RV, NDI, TPC command, DAI and/or ARI are the fields related to HARQ feedback. If a low latency requirement is 1 ms, it is not necessary to consider HARQ-ACK feedback (namely, retransmission by the HARQ-ACK feedback), it may be possible to reinterpret the fields and use the interpretation result to indicate another information. Whether the UE has to perform the operation of reinterpreting the specific field(s) and indicating whether to repeat the PDSCH and/or information related to the number of repetitions of the PDSCH may be configured through a higher layer signal. Or, a rule may be defined, agreed on and/or configured so that part of the specific fields is reinterpreted to indicate whether to repeat the PDSCH and/or information related to the number of repetitions only when a blind/HARQ-less PDSCH repetition operation is enabled through higher layer signaling.

And/or, a rule may be defined, agreed on and/or configured so that part of the fields is reinterpreted to indicate information related to inter-TTI hopping of a PDSCH being repeated without addition of a field to the existing DCI format and/or without size change (and/or without an additional BD configuration with respect to the existing BD). Frequency diversity gain may be expected through inter-TTI hopping. Also, through the frequency diversity gain, the decoding performance of a PDSCH being repeated may be further improved.

If an operation of reinterpreting part of the fields and indicating information related to inter-TTI hopping of a PDSCH being repeated without addition of a field to the existing DCI format and/or without size change (and/or without an additional BD configuration with respect to the existing BD) is performed, whether the corresponding operation has to be performed may be configured for the UE through higher layer signaling. Or, a rule may be defined, agreed on and/or configured so that part of the fields may be reinterpreted to indicate information related to inter-TTI hopping of a PDSCH being repeated only when a blind/HARQ-less PDSCH repetition operation is enabled through higher layer signaling. Here, the information related to inter-TTI hopping is an example, which may indicate (pattern/offset) information related to which frequency resource to be used for each TTI when the same TB is transmitted repeatedly to a plurality of TTIs.

And/or, if the inter-TTI hopping operation of a PDSCH is configured and/or indicated, a field indicating DMRS sharing may be reinterpreted. If the inter-TTI hopping operation of a PDSCH being repeated is configured and/or indicated, the DMRS sharing operation may not be preferable. This is so because, while a plurality of TTIs for which DMRS sharing is to be applied have to use at least the same precoding resource block group (PRG), the hopping operation for obtaining the frequency diversity gain has to use different frequency resources as much as possible. Therefore, if an inter-TTI hopping operation of a PDSCH being repeated is configured and/or indicated, a rule may be defined, agreed on and/or configured so that a field indicating DMRS sharing is reinterpreted to indicate whether to repeat the PDSCH and/or information related to the number of repetitions and/or information related to inter-TTI hopping of a PDSCH being repeated.

Second Embodiment

In what follows, described will be a method for interpreting CFI according to whether a PDSCH repetition-related operation is enabled.

Reliability of URLLC transmission and reception may be affected by reliability of a control channel, which may be greatly influenced in particular by decoding performance of a Physical Control Format Indicator Channel (PCFICH). In case a UE wrongly decodes a PCFICH and recognizes a control channel area (for example, the number of symbols occupied by the control channel) incorrectly, reliability of the control channel may be adversely affected, and (in the case of a subslot operation) the UE may recognize a downlink (DL) TTI boundary in a way different from how a base station (BS) understands the DL TTI boundary and perform decoding accordingly. To prevent this operation, a method for configuring information about a control channel area for a UE through higher layer signaling is under consideration.

Therefore, a UE may determine whether to adopt a control format indicator (CFI) value based on a PCFICH or whether to adopt a CFI value through higher layer signaling by using the method described in the following.

The methods described below are divided only for the convenience of descriptions, and it should be clearly understood that a structure of a particular method may be substituted by a structure of another method or may be applied in a combination thereof.

(Method 1)

If a higher layer signal defines whether to enable the blind/HARQ-less PDSCH (or HARQ-less and/or blind PDSCH) repetition operation, and/or if support for an operation for indicating whether to repeat a PDSCH and/or information related to the number of repetitions through reinterpretation of a specific field of the existing DCI format as described in the first embodiment is defined, agreed on and/or configured by a higher layer signal, and/or if support for an operation for indicating information related to inter-TTI hopping of a PDSCH being repeated through reinterpretation of a specific field is defined, agreed on and/or configured by a higher layer signal, a UE may accordingly determine whether to adopt a CFI value based on a PCFICH or whether to adopt a CFI value configured through a higher layer signal. In other words, a rule may be defined in such a way that in case a blind/HARQ-less PDSCH repetition operation is enabled through higher layer signaling, the UE uses a CFI value configured through higher layer signaling but uses a CFI value based on a PCFICH, otherwise.

(Method 2)

If an operation for indicating whether to repeat a PDSCH and/or information related to the number of repetitions through reinterpretation of a specific field of the existing DCI format by a higher layer signal is enabled, a rule may be defined so that a UE uses a CFI value configured through a higher layer signal but uses a CFI value based on a PCFICH, otherwise.

(Method 3)

A UE may interpret a CFI value differently for cases where the number of repetitions is smaller than a predetermined value and for the remaining cases. If the number of repetitions is high, it means that a larger number of repetitions are required, which may be interpreted that channel conditions are not good; in this case, it may be better for the UE to use a value preconfigured by a higher layer signal as the CFI value rather than depend on PCFICH decoding. Therefore, a rule may be defined so that the UE uses a CFI value based on the PCFICH when the number of PDSCH repetitions is smaller than a predetermined value but uses a CFI value configured through higher layer signaling when it is larger than a predetermined value.

(Method 4)

A rule may be defined so that in case an operation for indicating information related to inter-TTI hopping of a PDSCH being repeated through reinterpretation of a specific field of the existing DCI format by a higher layer signal is enabled, a UE uses a CFI value configured through the higher layer signal and otherwise uses a CFI value based on a PCFICH.

(Method 5)

A rule may be defined so that in reducing payload of DCI to be less than a conventional payload to improve reliability of a PDCCH (namely, in introducing compact DCI), a UE uses a CFI value configured through an higher layer signal within a TTI configured for monitoring of the DCI format or within a subframe including the corresponding TTI while the UE uses a CFI value based on a PCFICH within a TTI not configured for monitoring of the DCI format or within a subframe including the TTI.

Third Embodiment

Now, a method for determining PUCCH resources for transmitting HARQ-ACK will be described.

In case the ARI field of the existing DCI format is reinterpreted to indicate whether to repeat and/or information related to the number of repetitions or information related to inter-TTI hopping, a UE may encounter ambiguity in determining HARQ-ACK resources.

To prevent the ambiguity, a rule may be defined, agreed on and/or configured as described below.

The methods described below are divided only for the convenience of descriptions, and it should be clearly understood that a structure of a particular method may be substituted by a structure of another method or may be applied in a combination thereof.

(Method 1)

A rule may be defined, agreed on and/or configured so that in case the ARI field of the existing DCI format is reinterpreted to indicate whether to repeat and/or information related to the number of repetitions or information related to inter-TTI hopping, the UE transmits HARQ-ACK by using a PUCCH resource defined separately in advance.

(Method 2)

A rule may be defined, agreed on and/or configured so that in case the ARI field of the existing DCI format is reinterpreted to indicate whether to repeat and/or information related to the number of repetitions or information related to inter-TTI hopping, the UE uses a resource agreed on in advance among PUCCH resources associated with the respective states of the ARI field (for example, associated with the first state or associated with the first state among resources configured with a specific PUCCH format).

(Method 3)

A rule may be defined, agreed on and/or configured so that in case the ARI field of the existing DCI format is reinterpreted to indicate whether to repeat and/or information related to the number of repetitions or information related to inter-TTI hopping, the UE uses a PUCCH resource associated with a specific Control Channel Element (CCE) (for example, lowest CCE index).

And/or a rule may be defined, agreed on and/or configured so that in case the TPC field of the existing DCI format is reinterpreted to indicate whether to repeat and/or information related to the number of repetitions or information related to inter-TTI hopping, a TPC command is considered to be 0 dB (namely no adjustment). And/or a rule may be defined, agreed on and/or configured so that in case accumulation due to a TPC command is not enabled, a value agreed on in advance and/or a preconfigured, specific absolute power value is applied.

Fourth Embodiment

In what follows, described will be a method for reporting whether PDSCH decoding with respect to a specific TTI within time duration is possible.

Suppose a UE is capable of performing PDSCH decoding with respect to a specific TTI within specific time duration in a situation where a data channel is transmitted repeatedly over a plurality of TTIs with respect to the same TB described in the first embodiment. If decoding is successfully performed, the UE's processing of a data channel transmitted repeatedly in the subsequent TTIs may not be needed (or not useful). Therefore, power saving may be expected as the UE skips processes after the decoding is done successfully.

In other words, a rule may be defined, agreed on and/or configured so that whether PDSCH decoding may be performed with respect to a specific TTI within time duration is defined as capability of a UE, and the UE capability is reported to a base station (or network).

Here, "time duration" may correspond to a time period from the time at which a PDSCH is received until the next TTI (or the corresponding TTI after a predefined/preconfigured amount of time) with respect to the PDSCH transmitted repeatedly. Or, the time duration may correspond to a time period from the time at which a PDSCH is received until reception of a scheduling PDCCH with respect to the PDSCH transmitted repeatedly. The time duration may be predefined or indicated together when the UE reports its capability. And/or, if a plurality of time duration is defined and/or indicated, the UE may independently report whether PDSCH decoding may be performed with respect to a specific TTI in each of the plurality of time duration.

And/or, according to the capability of performing PDSCH decoding with respect to a specific TTI within time duration and/or configuration of a base station with respect to the corresponding operation, the HARQ-ACK transmission operation of a UE may be determined differently. Suppose the UE is capable of performing PDSCH decoding with respect to a specific TTI within time duration or the corresponding operation is configured. If PDSCH decoding is performed successfully, the UE may perform HARQ-ACK feedback at a timing after a predefined and/or preconfigured processing time from the time of successful reception of the PDSCH and may not be requested to perform decoding of the PDSCH transmitted repeatedly afterwards. Also, the UE may not be requested to perform buffering and/or combining with respect to the PDSCH transmitted repeatedly afterwards and may not be requested to perform HARQ-ACK transmission with respect to the PDSCH transmitted repeatedly afterwards. Meanwhile, a rule may be defined, agreed on and/or configured so that a UE without the capability or not configured for the corresponding operation performs HARQ-ACK feedback corresponding to the last PDSCH reception TTI after combining the PDSCH transmitted repeatedly in a plurality of TTIs.

And/or, according to the UE's capability of combining a PDSCH transmitted repeatedly and/or configuration of a base station with respect to the corresponding operation, the HARQ-ACK transmission operation of the UE may be determined differently. A rule may be defined, agreed on and/or configured so that a UE supporting combining or configured for combining performs HARQ-ACK feedback corresponding to the last PDSCH reception TTI after performing combining of the PDSCH transmitted repeatedly in a plurality of TTIs while a UE not supporting combining nor configured for combining performs separately HARQ-ACK feedback corresponding to each PDSCH received in each of the plurality of TTIs.

Fifth Element

Described will be a method for indicating and/or configuring whether to report HARQ-ACK with respect to a PDSCH.

Whether to enable an operation (for example, blind/HARQ-less PDSCH repetition) for supporting specific latency and/or reliability requirement may be configured through an higher layer signal. And/or, support for latency and/or reliability requirement itself may be configured through a higher layer signal. A UE configured for the support may not have to perform retransmission and/or HARQ-ACK report depending on the latency requirement.

When it is assumed that whether a PDSCH is repeated and/or the number of repetitions is indicated dynamically to the UE, it may not be preferable to determine whether to report HARQ-ACK through a higher layer signal. As one example, this is so because even if blind/HARQ-less PDSCH repetition is configured through a higher layer signal to support specific latency and/or reliability requirement, a base station doesn't have to support the corresponding latency and/or reliability requirement depending on the type of traffic but may request a retransmission operation without repetition and/or through HARQ-ACK.

Therefore, a rule may be defined, agreed on and/or configured so that a physical layer signal indicates whether a UE should report an HARQ-ACK with respect to a specific PDSCH.

The rule may be such that it is applied only to the case where an operation for supporting specific latency and/or reliability requirement (for example, blind/HARQ-less PDSCH repetition) is made possible through a higher layer signal. A rule may be defined, agreed on and/or configured so that in case the dynamic indication indicates an HARQ-ACK report, the UE reports an HARQ-ACK with respect to a repetition bundle of the PDSCH or reports an HARQ-ACK with respect to the whole (or part) of individual PDSCHs corresponding to the repetition bundle. Meanwhile, a rule may be defined, agreed on and/or configured so that in case the dynamic indication indicates not to report an HARQ-ACK, the UE decodes a repetition bundle of the PDSCH but does not report an HARQ-ACK.

Whether to report the HARQ-ACK may be indicated and/or configured by an explicitly added bit field (for example, a dynamic indication field). In this case, too, the operation for supporting specific latency and/or reliability requirement (for example, blind/HARQ-less repetition of the PDSCH) is made possible through a higher layer signal.

And/or, whether to report the HARQ-ACK may be determined by reinterpretation of the existing DCI field.

And/or, whether to report the HARQ-ACK may be determined by the number of PDSCH repetitions. As one example, a rule may be defined, agreed on and/or configured so that in case the number of repetitions is smaller than a predetermined value, the UE reports an HARQ-ACK with respect to the repetition bundle or reports an HARQ-ACK with respect to the whole (or part) of individual PDSCHs corresponding to the repetition bundle. Meanwhile, a rule may be defined, agreed on and/or configured so that if the number of repetitions exceeds the predetermined value, the UE decodes the repetition bundle of the PDSCH but does not report the HARQ-ACK.

Sixth Embodiment

In what follows, described in detail will be a method for configuring and/or reporting whether to enable an operation for supporting specific latency and/or reliability requirement.

Whether to enable an operation for supporting specific latency and/or reliability requirement (for example, blind/HARQ-less PDSCH (or HARQ-less and/or blind PDSCH) repetition and/or UL semi-persistent scheduling (SPS) with repetition) may be configured through a higher layer signal. Also, whether to enable the operation may be configured independently for each TTI length or each combination of DL and UL TTI lengths. Or, whether to enable the operation may be defined (differently) independently for each frame structure and so configured for a UE.

And/or, information about whether to enable an operation for supporting specific latency and/or reliability requirement (for example, blind/HARQ-less PDSCH repetition and/or UL SPS with repetition) (in how many carrier components (CCs) and/or cells) may be defined as UE capability and reported to the base station (or network).

The information may be reported separately for each TTI length (group) or for each combination (group) of DL and UL TTI lengths. As one example, the UE capability may be defined separately for each subslot, slot, and subframe or for each combination of {DL=subslot, UL=subslot}, {DL=subslot, UL=slot}, {DL=slot, UL=slot}, and {DL=subframe, UL=subframe}.

Or, the UE capability may be defined (differently) separately for each frame structure and reported to the base station (or network). Or, the UE capability may be defined separately for each band and/or each band combination.

And/or if the UE reports the UE capability, the base station may determine to which degree the UE supports the operation based on the UE capability and configure and/or operate so that the reported operation and/or a specific operation of the reported operation may be supported. For example, a specific operation may include an operation of interpreting a DCI field differently to add a specific field to the existing DCI format, a BD operation with respect to a DCI monitoring method/the number of BD or specific DCI format, an operation for receiving and/or decoding of a PDSCH transmitted repeatedly, and an HARQ-ACK transmission operation with respect to the last PDSCH among the received and/or decoded PDSCHs.

In particular, a rule may be defined, agreed on and/or configured so that the UE capability, which indicates whether an operation for supporting the specific latency and/or reliability requirement (for example, blind/HARQ-less PDSCH repetition and/or repeated UL SPS) is enabled (in how many carrier components and/or cells), is defined and reported only for a UE supporting an operation of configuring the number of symbols of a control region (of a specific cell) through a higher layer signal and receiving downlink (DL) control and data based on the configured number of symbols.

In other words, for the case of a UE not supporting an operation of configuring the number of symbols of a control region (of a specific cell) through a higher layer signal and receiving downlink (DL) control and data based on the configured number of symbols, the operation for supporting the specific latency and/or reliability requirement (for example, blind/HARQ-less PDSCH repetition and/or repeated UL SPS) may not always be supported, either.

Meanwhile, for the case of a UE not supporting an operation of configuring the number of symbols of a control region (of a specific cell) through a higher layer signal and receiving downlink (DL) control and data based on the configured number of symbols, whether the operation for supporting the specific latency and/or reliability requirement (for example, blind/HARQ-less PDSCH repetition and/or repeated UL SPS) is supported may be reported through capability signaling.

Through the method above, a UE is allowed to support PDSCH repetition only for the case where the UE supports configuration of the number of symbols of a semi-static control region through a higher layer signal, thereby improving reception reliability of the PDSCH repetition.

Also, in the case of a data repetition operation in the existing MTC, it may be known in advance whether to count as soon as a UE receives an RRC setup in a semi-static situation. However, the present disclosure is different in that a repetition operation is performed according to received CFI irrespective of a semi-static situation. Therefore, the present disclosure may confirm an invalid TTI dynamically and receive and/or decode a PDSCH even if the invalid TTI is different in each subframe, thereby improving reception reliability of the PDSCH repetition.

Seventh Embodiment

First, described will be a method for improving reception reliability of PDSCH repetition in the occurrence of a TTI in which the PDSCH repetition operation is unable to transmit downlink data.

In case whether to enable a blind/HARQ-less PDSCH (or HARQ-less and/or blind PDSCH) repetition operation is defined, agreed on and/or configured by a higher layer signal, information related to the number of repetitions of a Physical Downlink Shared Channel (PDSCH) (for example, repetition number) may be indicated and/or transmitted by a base station to a UE through a physical layer signal. The UE may know for how many TTIs the PDSCH is transmitted repeatedly with respect to the same transport block (TB) based on the information about the number of repetitions and perform a reception operation. For example, the information related to the number of repetitions may be a total number of Transmission Time intervals (TTIs) for PDSCH repetitions scheduled by the corresponding PDCCH, including the TTI at the time of receiving the PDCCH.

In case the first short TTI within a subframe (for example, subslot #0) is unable to transmit downlink (DL) data (namely, in case the PDSCH may not be transmitted to the subslot #0) according to the Control Format Indicator (CFI) value configured through a Physical Control Format Indicator Channel (PCFICH) or a higher layer signal, the UE may interpret the TTIs in which repeated transmission of an actual PDSCH is performed differently from how the base station interprets the TTIs according to whether the corresponding TTI (for example, subslot) is included in the total number of transmission TTIs for PDSCH repetitions indicated by the information related to the number of repetitions. Here, "#number" may denote the index. For example, subslot #0 may denote a subslot with an index of 0 within a subframe.

As one example, as shown in FIG. 18(a), as many PDSCHs as the total number of transmission TTIs for PDSCH repetitions may be transmitted while subslot #0 1811 to which the PDSCH may not be transmitted is excluded and/or skipped over. Similarly, as shown in FIG. 18(b), as many PDSCHs as the total number of transmission TTIs for PDSCH repetitions may be transmitted by including even subslot #0 1821 to which the PDSCH may not be transmitted. Interpretations as given above may degrade reception reliability of the PDSCH between an base station and a UE.

Therefore, a rule may be defined, agreed on and/or configured so that in case whether to enable a blind/HARQ-less PDSCH repetition operation is defined by a higher layer signal, a UE assumes the number of transmissions (TTIs) of a PDSCH corresponding to repeated transmission as in the following methods to perform PDSCH decoding.

The methods described below are divided only for the convenience of descriptions, and it should be clearly understood that a structure of a particular method may be substituted by a structure of another method or may be applied in a combination thereof.

(Method 1)

If a control region configured and/or indicated through a higher layer signal and/or physical layer signal consists of two or three OFDM symbols, the UE excludes and/or skips the corresponding TTI (for example, subslot #0) or TTIs affected by the length of the control region (for example, subslot #0 and subslot #1) and performs decoding by assuming that as many PDSCHs as the total number of transmission TTIs for configured and/or indicated PDSCH repetitions are transmitted. For example, as shown in FIG. 18(*a*), the UE may perform decoding by taking into account that the PDSCH has been transmitted repeatedly with subslot #0 1811 being skipped over.

(Method 2)

If a control region configured and/or indicated through a higher layer signal and/or physical layer signal consists of one OFDM symbol, the UE performs decoding by assuming that as many PDSCHs as the total number of transmission TTIs for configured and/or indicated PDSCH repetitions including the corresponding TTI (for example, subslot #0) or a TTI affected by the length of the control region (for example, subslot #0 and subslot #1) are transmitted. For example, as shown in FIG. 18(*b*), the UE may perform decoding as if the PDSCH has been transmitted repeatedly including subslot #0 1821.

(Method 3)

The UE may perform decoding by always excluding and/or skipping the corresponding TTI (for example, subslot #0) regardless of the number of symbols of the control region and by assuming that as many PDSCHs as the total number of transmission TTIs for configured and/or indicated PDSCH repetitions are transmitted.

(Method 4)

A rule may be defined, agreed on and/or configured so that a PDSCH repetition operation is limited within subframe boundaries and a UE performs decoding of PDSCHs transmitted repeatedly over a plurality of TTIs with respect to the same TB only within a subframe. In other words, a UE may not expect decoding of PDSCHs transmitted repeatedly in a plurality of TTIs with respect to the same TB over a plurality of contiguous subframes.

(Method 5)

A UE may determine TTIs in which a PDSCH transmitted repeatedly according to a method for indicating the number of symbols of a downlink (DL) control region with respect to a specific carrier and/or cell (for example, a physical layer signal (PCFICH) or higher layer signal) is received. If the number of symbols of the control region is indicated by a PCFICH, performance of a control channel may be determined by the PCFICH decoding performance of the UE. Also, in determining a subslot pattern, the boundary between subslot #0 and subslot #1 may be wrongly determined, which leads to degradation of downlink data channel decoding performance.

Therefore, in case the number of symbols of a control region (of a specific cell) is indicated by the PCFICH, the UE may always exclude and/or skip a TTI within the control region (for example, subslot #0) or TTIs affected by the length of the control region (for example, subslot #0 and subslot #1) and perform decoding by assuming that the PDSCH is actually transmitted as many times as the total number of transmission TTIs for configured and/or indicated PDSCH repetitions. Meanwhile, in case the number of symbols of a control region (of a specific cell) is configured through a higher layer signal, if the control region consists of two or three OFDM symbols according to the configured number of symbols of the control region, the UE excludes and/or skips a TTI within the control region (for example, subslot #0) and performs decoding by assuming that the PDSCH is actually transmitted as many times as the total number of transmission TTIs for configured and/or indicated PDSCH repetitions while, if the control region consists of one OFDM symbols, the UE includes a TTI within the control region (for example, subslot #0) and performs decoding by assuming that the PDSCH is actually transmitted as many times as the total number of transmission TTIs for configured and/or indicated PDSCH repetitions.

In the present specification, the control region may indicate the number of OFDM symbols used for PDCCH transmission within a subframe. Also, the control region may be determined by the information indicated to the UE through a physical layer signal (for example, PCFICH) and/or higher layer signal (for example, RRC message).

Eighth Embodiment

Before the eighth embodiment is described, the structure of a radio frame is first described. In FIG. 1(*a*), a subframe using $\Delta f = 15$ kHz may be further divided into six subslots according to Table 10 below.

TABLE 10

| Subslot number | 0 | 1 | 2 | 3 | 4 | 5 | |
|---|---|---|---|---|---|---|---|
| Slot number | | $2i$ | | | $2i+1$ | | |
| Uplink subslot pattern | 0, 1, 2 | 3, 4 | 5, 6 | 0, 1 | 2, 3 | 4, 5, 6 | |
| Downlink subslot pattern 1 | 0, 1, 2 | 3, 4 | 5, 6 | 0, 1 | 2, 3 | 4, 5, 6 | |
| Downlink subslot pattern 2 | 0, 1 | 2, 3, 4 | 5, 6 | 0, 1 | 2, 3 | 4, 5, 6 | |

In the case of FDD, 10 subframes, 20 slots, or a maximum of 60 subslots may be used for downlink transmission at 10 ms intervals while 10 subframes, 20 slots, or a maximum of 60 subslots may be used for uplink transmission at 10 ms intervals. Uplink and downlink transmission may be separated from each other in the frequency domain. In a half-duplex FDD operation, a UE is unable to perform transmission and reception simultaneously. On the other hand, in a full-duplex FDD operation, the UE is capable of performing transmission and reception simultaneously.

Next, described will be a method for determining and/or configuring whether to allow DL Demodulation Reference Signal (DMRS) sharing with respect to a TTI over a plurality of contiguous subframes.

In the case of a subslot-PDSCH, DMRS sharing may be allowed for the purpose of reducing overhead due to DMRS. A rule is defined that to prevent performance degradation of channel estimation, DMRS sharing is allowed only between two subslots and taking into account the processing time of a UE, the corresponding DMRS is mapped to the preceding one of the two subslots at the time of DMRS sharing. According to a predefined rule (for example, 3GPP specification), if a UE fails to detect downlink (DL) assignment short downlink control information (sDCI) at subslot #n−1 and the downlink assignment sDCI detected at subslot #n indicates absence of DMRS in the subslot #n, the UE does not expect decoding of subslot-PDSCH in the subslot #n.

Whether to allow DL DMRS sharing with respect to a TTI over a plurality of contiguous subframes may be determined by the following method.

The methods described below are divided only for the convenience of descriptions, and it should be clearly understood that a structure of a particular method may be substituted by a structure of another method or may be applied in a combination thereof.

(Method 1)

A rule may be defined, agreed on and/or configured so that whether to allow the DL DMRS sharing operation for a TTI over a plurality of contiguous subframes is determined differently according to the number of symbols of a control region configured and/or indicated through a higher layer signal and/or physical layer signal.

As one example, if a control region configured and/or indicated through a higher layer signal and/or physical layer signal consists of one OFDM symbol, the DL DMRS sharing operation may be allowed, applied, configured and/or indicated with respect to a TTI over a plurality of contiguous subframes. Meanwhile, if a control region configured and/or indicated through a higher layer signal and/or physical layer signal consists of two or three OFDM symbols, the DL DMRS sharing operation may not be allowed, applied, configured and/or indicated with respect to a TTI over a plurality of contiguous subframes. In this case, the UE may receive a DMRS with respect to each individual TTI.

(Method 2)

A rule may be defined, agreed on and/or configured so that whether the DL DMRS sharing operation is allowed, applied, configured, and/or indicated with respect to a TTI over a plurality of contiguous subframes is determined according to whether the number of symbols of a control region with respect to the length of the corresponding TTI is configured through a higher layer signal or indicated by a physical layer signal (for example, PCFICH). As one example, if the number of symbols of a control region is configured through a higher layer signal, whether to allow, apply, configure and/or indicate the DL DMRS may be determined by the number of symbols of a control region configured according to the method 1. On the other hand, if the number of symbols of a control region is indicated by a physical layer signal (for example, PCFICH), the UE may not expect DL DMRS sharing to be allowed, applied, configured, and/or indicated.

Since examples of the embodiments proposed in the present specification may also be included as implementation methods of the present disclosure, it is obvious that the examples may be regarded as a kind of embodiments.

Also, as described above, although embodiments proposed by the present specification may be implemented independently, they may still be implemented in the form of a combination (merge) of part of embodiments. A rule may be defined, agreed on and/or configured so that a base station provides information about whether to apply embodiments (or information about rules of the embodiments) to a UE through predefined signaling (for example, physical layer signaling and/or higher layer signaling).

FIG. 19 is a flow diagram illustrating an operation method of a UE according to the present specification.

Referring to FIG. 19, first, a user equipment (UE) may transmit, to a base station (BS), capability information including the first information indicating support for a PDSCH repetition-related operation S1901.

The PDSCH repetition-related operation may be an HARQ-less/blind (or HARQ-less and/or blind) PDSCH repetition operation.

The first information may include information indicating whether to support repetition for each Transmission Time Interval (TTI) length or information indicating whether to support repetition of one or more specific TTI lengths.

For example, the first information may include information indicating whether to support repetition of subframes, information indicating whether to support repetition of slots, and/or information indicating whether to support repetition of subslots. As a specific example, information indicating support for subframe repetition may be transmitted to a base station through a higher layer parameter pdsch-RepSubframe and/or pdsch-RepSubframe-r15. Information indicating support for slot repetition may be transmitted to the BS through a higher layer parameter pdsch-RepSlot. Information indicating support for subslot repetition may be transmitted to the BS through a higher layer parameter pdsch-RepSubSlot.

Also, the capability information may further include information indicating whether configuration of the number of symbols of a control region through the higher layer signal is supported (for example, semiStaticCFI-r15 or semiStaticCFI-Pattern-r15). For example, the base station may receive information indicating support for configuration of the number of symbols of the control region and when configuration of the number of symbols of the control region is supported, may transmit information about the number of symbols of the control region to the UE through a higher layer signal. At this time, the UE may ignore information about the number of symbols of the control region coming through the PCFICH channel but receive information about the number of symbols of the control region through a higher layer signal to receive and/or decode control information.

Also, the first information may be transmitted when configuration of the number of symbols of a control region through a higher layer signal is supported (for example, semiStaticCFI-r15 or semiStaticCFI-Pattern-r15). Here, the first information may be the information indicating support for subframe repetition.

In other words, the subframe repetition may be supported when configuration of the number of symbols of a control region through a higher layer signal (for example, semiStaticCFI-SlotSubslotNonMBSFN, semiStaticCFI-SlotSubslotMBSFN, semiStaticCFI-SubframeNonMBSFN, or semiStaticCFI-SubframeMBSFN) is supported.

And/or, the first information may include information about support for repetition for each DL and UL TTI length combination or information about support for repetition of a combination of one or more specific TTI lengths. For example, the first information may include information about support for each of uplink TTI length combination 1 {DL=subslot, UL=subslot}, uplink TTI length combination 2 {DL=subslot, UL=slot}, uplink TTI length combination 3 {DL=slot, UL=slot}, and uplink TTI length combination 4 {DL=subframe, UL=subframe}.

And/or the first information may include information indicating support for repetition for each frame structure or information indicating support for repetition of one or more specific frame structures.

And/or the first information may include information indicating support for repetition for each band and/or each band combination or information indicating support for repetition of one or more specific bands and/or band combination.

Next, the UE may receive the second information for configuring whether to enable the PDSCH repetition-related operation and/or information about the number of symbols of a control region from the BS through a higher layer signal S1902. The BS may transmit, to the UE, the second information and/or information about the number of symbols of the control region based on the capability information. For example, the second information may be transmitted to the UE through a higher layer parameter blindSlotSubslotPDSCH-Repetitions and/or blindSubframePDSCH-Repetitions. Also, the information about the number of symbols of a control region may be transmitted to the UE through a higher layer parameter semiStaticCFI-SlotSubslotNonMBSFN, semiStaticCFI-SlotSubslotMBSFN, semiStaticCFI-SubframeNonMBSFN, or semiStaticCFI-SubframeMBSFN.

Next, when the second information is configured as enable, the UE may receive, from the BS, downlink control information (DCI) related to reception of a PDSCH repetition S1903. For example, the UE may check the number of symbols of DCI based on the information about the number of symbols of a control region and receive the DCI. The DCI related to reception of a PDSCH repetition may include information about the number of repetitions of the PDSCH (for example, Repetition number).

Next, the UE may receive the PDSCH repeatedly from the BS based on the DCI S1904. The UE may receive the PDSCH repeatedly based on the information about the number of repetitions.

In what follows, since the operation method of a UE illustrated in FIG. 19 is the same as the operation method of a UE described with reference to FIGS. 1 to 18, detailed descriptions of the remaining part thereof will be omitted.

Related to the method, operation of a UE described in detail above may be implemented specifically by the UE device 2120 described with reference to FIG. 21. For example, operation of the UE described above may be performed by the processor 2121 and/or RF unit 2123.

Referring to FIG. 21, first, the processor 2121 may transmit capability information including the first information indicating support for a PDSCH repetition-related operation to a base station through the RF unit 2123, S1901.

The PDSCH repetition-related operation may be an HARQ-less/blind (or HARQ-less and/or blind) PDSCH repetition operation.

The first information may include information indicating whether to support repetition for each Transmission Time Interval (TTI) length or information indicating whether to support repetition of one or more specific TTI lengths.

For example, the first information may include information indicating whether to support repetition of subframes, information indicating whether to support repetition of slots, and/or information indicating whether to support repetition of subslots. As a specific example, information indicating support for subframe repetition may be transmitted to a BS through a higher layer parameter pdsch-RepSubframe and/or pdsch-RepSubframe-r15. Information indicating support for slot repetition may be transmitted to the BS through a higher layer parameter pdsch-RepSlot. Information indicating support for subslot repetition may be transmitted to the BS through a higher layer parameter pdsch-RepSubSlot.

Also, the capability information may further include information indicating whether configuration of the number of symbols of a control region through the higher layer signal is supported (for example, semiStaticCFI-r15 or semiStaticCFI-Pattern-r15). For example, the BS may receive information indicating support for configuration of the number of symbols of the control region and when configuration of the number of symbols of the control region is supported, may transmit information about the number of symbols of the control region to the UE through a higher layer signal.

At this time, the UE may ignore information about the number of symbols of the control region coming through the PCFICH channel but receive information about the number of symbols of the control region through a higher layer signal to receive and/or decode control information.

Also, the first information may be transmitted when configuration of the number of symbols of a control region through a higher layer signal is supported (for example, semiStaticCFI-r15 or semiStaticCFI-Pattern-r15). Here, the first information may be the information indicating support for subframe repetition.

In other words, the subframe repetition may be supported when configuration of the number of symbols of a control region through a higher layer signal (for example, semiStaticCFI-SlotSubslotNonMBSFN, semiStaticCFI-SlotSubslotMBSFN, semiStaticCFI-SubframeNonMBSFN, or semiStaticCFI-SubframeMBSFN) is supported.

And/or, the first information may include information about support for repetition for each DL and UL TTI length combination or information about support for repetition of a combination of one or more specific TTI lengths. For example, the first information may include information about support for each of uplink TTI length combination 1 {DL=subslot, UL=subslot}, uplink TTI length combination 2 {DL=subslot, UL=slot}, uplink TTI length combination 3 {DL=slot, UL=slot}, and uplink TTI length combination 4 {DL=subframe, UL=subframe}.

And/or the first information may include information indicating support for repetition for each frame structure or information indicating support for repetition of one or more specific frame structures.

And/or the first information may include information indicating support for repetition for each band and/or each band combination or information indicating support for repetition of one or more specific bands and/or band combination.

Next, the processor 2121 may receive the second information for configuring whether to enable the PDSCH repetition-related operation and/or information about the number of symbols of a control region from the BS via the RF unit 2123 through a higher layer signal S1902. The BS may transmit, to the UE, the second information and/or information about the number of symbols of the control region based on the capability information. For example, the second information may be transmitted to the UE through a higher layer parameter blindSlotSubslotPDSCH-Repetitions and/or blindSubframePDSCH-Repetitions. Also, the information about the number of symbols of a control region may be transmitted to the UE through a higher layer parameter semiStaticCFI-SlotSubslotNonMBSFN, semiStaticCFI-SlotSubslotMBSFN, semiStaticCFI-SubframeNonMBSFN, or semiStaticCFI-SubframeMBSFN.

Next, when the second information is configured as enable, the processor 2121 may receive, from the BS, downlink control information (DCI) related to reception of a PDSCH repetition via the RF unit 2123, S1903. For example, the UE may check the number of symbols of DCI based on the information about the number of symbols of a control region and receive the DCI. The DCI related to reception of a PDSCH repetition may include information about the number of repetitions of the PDSCH (for example, Repetition number).

Next, the processor 2121 may receive the PDSCH repeatedly from the BS based on the DCI via the RF unit 2123, S1904. The UE may receive the PDSCH repeatedly based on the information about the number of repetitions.

In what follows, since the operation method of a UE illustrated in FIG. 21 is the same as the operation method of a UE described with reference to FIGS. 1 to 20, detailed descriptions of the remaining part thereof will be omitted.

FIG. 20 is a flow diagram illustrating an operation method of a base station according to the present specification.

Referring to FIG. 20, first, a base station (BS) may receive capability information including the first information indicating support for a PDSCH repetition-related operation from a user equipment (UE) S2001.

The PDSCH repetition-related operation may be an HARQ-less/blind (or HARQ-less and/or blind) PDSCH repetition operation.

The first information may include information indicating whether to support repetition for each Transmission Time Interval (TTI) length or information indicating whether to support repetition of one or more specific TTI lengths.

For example, the first information may include information indicating whether to support repetition of subframes, information indicating whether to support repetition of slots, and/or information indicating whether to support repetition of subslots. As a specific example, information indicating support for subframe repetition may be transmitted to a base station (BS) through a higher layer parameter pdsch-Rep-Subframe and/or pdsch-RepSubframe-r15. Information indicating support for slot repetition may be transmitted to the BS through a higher layer parameter pdsch-RepSlot. Information indicating support for subslot repetition may be transmitted to the BS through a higher layer parameter pdsch-RepSubSlot.

Also, the capability information may further include information indicating whether configuration of the number of symbols of a control region through the higher layer signal is supported (for example, semiStaticCFI-r15 or semiStaticCFI-Pattern-r15).

Also, the first information may be received by the BS when the UE supports configuration of the number of symbols of a control region through a higher layer signal (for example, semiStaticCFI-r15 or semiStaticCFI-Pattern-r15). Here, the first information may be the information indicating support for subframe repetition.

In other words, the subframe repetition may be supported when the UE supports configuration of the number of symbols of a control region through a higher layer signal (for example, semiStaticCFI-SlotSubslotNonMBSFN, semiStaticCFI-SlotSubslotMBSFN, semiStaticCFI-SubframeNonMBSFN, or semiStaticCFI-SubframeMBSFN).

And/or, the first information may include information about support for repetition for each DL and UL TTI length combination or information about support for repetition of a combination of one or more specific TTI lengths. For example, the first information may include information about support for each of uplink TTI length combination 1 {DL=subslot, UL=subslot}, uplink TTI length combination 2 {DL=subslot, UL=slot}, uplink TTI length combination 3 {DL=slot, UL=slot}, and uplink TTI length combination 4 {DL=subframe, UL=subframe}.

And/or the first information may include information indicating support for repetition for each frame structure or information indicating support for repetition of one or more specific frame structures.

And/or the first information may include information indicating support for repetition for each band and/or each band combination or information indicating support for repetition of one or more specific bands and/or band combination.

Next, the BS may transmit, to the UE, a higher layer signal including the second information for configuring whether to enable the blind PDSCH repetition-related operation and/or information about the number of symbols of a control region S2002. The BS may transmit, to the UE, the second information and/or information about the number of symbols of the control region based on the capability information. For example, the second information may be transmitted to the UE through a higher layer parameter blindSlotSubslotPDSCH-Repetitions and/or blindSubframePDSCH-Repetitions. Also, the information about the number of symbols of a control region may be transmitted to the UE through a higher layer parameter semiStaticCFI-SlotSubslotNonMBSFN, semiStaticCFI-SlotSubslotMBSFN, semiStaticCFI-SubframeNonMBSFN, or semiStaticCFI-SubframeMBSFN.

Next, when the second information is configured as enable, the BS may transmit, to the BS, downlink control information (DCI) related to reception of a PDSCH repetition S2003. For example, the UE may check the number of symbols of DCI based on the information about the number of symbols of a control region and receive the DCI. The DCI related to reception of a PDSCH repetition may include information about the number of repetitions of the PDSCH (for example, Repetition number).

Next, the BS may transmit the PDSCH repeatedly to the UE S2004. The UE may receive the PDSCH repeatedly based on the information about the number of repetitions.

In what follows, since the operation method of a BS illustrated in FIG. 20 is the same as the operation method of a BS described with reference to FIGS. 1 to 20, detailed descriptions of the remaining part thereof will be omitted.

Related to the method, operation of a BS described in detail above may be implemented specifically by the BS device 2110 described with reference to FIG. 21. For example, operation of the base station described above may be performed by the processor 2111 and/or RF unit 2113.

Referring to FIG. 21, first, the processor 2111 may transmit capability information including the first information indicating support for a PDSCH repetition-related operation to a base station through the RF unit 2113, S2001.

The PDSCH repetition-related operation may be an HARQ-less/blind (or HARQ-less and/or blind) PDSCH repetition operation.

The first information may include information indicating whether to support repetition for each Transmission Time Interval (TTI) length or information indicating whether to support repetition of one or more specific TTI lengths.

For example, the first information may include information indicating whether to support repetition of subframes, information indicating whether to support repetition of slots, and/or information indicating whether to support repetition of subslots. As a specific example, information indicating support for subframe repetition may be transmitted to a base station through a higher layer parameter pdsch-RepSubframe and/or pdsch-RepSubframe-r15. Information indicating support for slot repetition may be transmitted to the BS through a higher layer parameter pdsch-RepSlot. Information indicating support for subslot repetition may be transmitted to the BS through a higher layer parameter pdsch-RepSubSlot.

Also, the capability information may further include information indicating whether configuration of the number of symbols of a control region through the higher layer signal is supported (for example, semiStaticCFI-r15 or semiStaticCFI-Pattern-r15).

Also, the first information may be received by the base station when the UE supports configuration of the number of symbols of a control region through a higher layer signal (for example, semiStaticCFI-r15 or semiStaticCFI-Pattern-r15). Here, the first information may be the information indicating support for subframe repetition.

In other words, the subframe repetition may be supported when the UE supports configuration of the number of symbols of a control region through a higher layer signal (for example, semiStaticCFI-SlotSubslotNonMBSFN, semiStaticCFI-SlotSubslotMBSFN, semiStaticCFI-SubframeNonMBSFN, or semiStaticCFI-SubframeMBSFN).

And/or, the first information may include information about support for repetition for each DL and UL TTI length combination or information about support for repetition of a combination of one or more specific TTI lengths. For example, the first information may include information about support for each of uplink TTI length combination 1 {DL=subslot, UL=subslot}, uplink TTI length combination 2 {DL=subslot, UL=slot}, uplink TTI length combination 3 {DL=slot, UL=slot}, and uplink TTI length combination 4 {DL=subframe, UL=subframe}.

And/or the first information may include information indicating support for repetition for each frame structure or information indicating support for repetition of one or more specific frame structures.

And/or the first information may include information indicating support for repetition for each band and/or each band combination or information indicating support for repetition of one or more specific bands and/or band combination.

Next, the processor 2111 may transmit, to the UE, a higher layer signal including the second information for configuring whether to enable the blind PDSCH repetition-related operation and/or information about the number of symbols of a control region via the RF unit 2113, S2002. The BS may transmit, to the UE, the second information and/or information about the number of symbols of the control region based on the capability information. For example, the second information may be transmitted to the UE through a higher layer parameter blindSlotSubslotPDSCH-Repetitions and/or blindSubframePDSCH-Repetitions. Also, the information about the number of symbols of a control region may be transmitted to the UE through a higher layer parameter semiStaticCFI-SlotSubslotNonMBSFN, semiStaticCFI-SlotSubslotMBSFN, semiStaticCFI-SubframeNonMBSFN, or semiStaticCFI-SubframeMBSFN.

Next, when the second information is configured as enable, the processor 2111 may transmit, to the UE, downlink control information (DCI) related to reception of a PDSCH repetition through the RF unit 2113, S2003. For example, the UE may check the number of symbols of DCI based on the information about the number of symbols of a control region and receive the DCI. The DCI related to reception of a PDSCH repetition may include information about the number of repetitions of the PDSCH (for example, Repetition number).

Next, the processor 2111 may transmit the PDSCH repeatedly to the UE through the RF unit 2113, S2004. The UE may receive the PDSCH repeatedly based on the information about the number of repetitions.

In what follows, since the operation of a BS illustrated in FIG. 21 is the same as the operation of a BS described with reference to FIGS. 1 to 20, detailed descriptions of the remaining part thereof will be omitted.

Device in General to which the Present Invention May be Applied

FIG. 21 illustrates a block diagram of a wireless communication device to which methods proposed in the present specification may be applied.

Referring to FIG. 21, a wireless communication system comprises a base station (BS) 2110 and a plurality of UEs 2120 located within the range of the BS 2110.

The BS 2110 comprises a processor 2111, memory 2112, and RF (Radio Frequency) unit 2113. The processor 2111 implements the functions, processes and/or methods described with reference to FIGS. 1 to 20. Layers of a wireless interface protocol may be implemented by the processor 2111. The memory 2112, being connected to the processor 2111, stores various kinds of information to operate the processor 2111. The RF unit 2113, being connected to the processor 2111, transmits and/or receives a radio signal.

The UE 2120 comprises a processor 2121, memory 2122, and RF unit 2123. The processor 2121 implements the functions, processes and/or methods described with reference to FIGS. 1 to 20. Layers of a wireless interface protocol may be implemented by the processor 2121. The memory 2122, being connected to the processor 2121, stores various kinds of information to operate the processor 2121. The RF unit 2123, being connected to the processor 2121, transmits and/or receives a radio signal.

The memory 2112, 2122 may be installed inside or outside the processor 2111, 2121 and may be connected to the processor 2111, 2121 via various well-known means.

Also, the BS 2110 and/or the UE 2120 may be equipped with a single antenna or multiple antennas.

FIG. 22 illustrates a block diagram of a communication device according to one embodiment of the present disclosure.

In particular, FIG. 22 illustrates the UE of FIG. 21 in more detail.

Referring to FIG. 22, the UE may comprise a processor (or digital signal processor (DSP)) 2210, RF module (or RF unit) 2235, power management module 2205, antenna 2240, battery 2255, display 2215, keypad 2220, memory 2230, Subscriber Identification Module (SIM) card 2225 (this configuration is optional), speaker 2245, and microphone 2250. The UE may also include a single antenna or multiple antennas.

The processor 2210 implements the functions, processes and/or methods described with reference to FIGS. 1 to 21. Layers of a wireless interface protocol may be implemented by the processor 2210.

The memory 2230, being connected to the processor 2210, stores various kinds of information to operate the processor 2210. The memory 2230 may be installed inside or outside the processor 2210 and may be connected to the processor 2210 via various well-known means.

The user enters command information such as a phone number by pushing (or touching) buttons of the keypad 2220 or by voice activation using the microphone 2250. The processor 2210 receives the command information and performs an appropriate function such as dialing the phone number. Operational data may be extracted from the SIM card 2225 or memory 2230. Also, the processor 2210 may display the command information or operational information on the display 2215 to support user's recognition and for the convenience of the user.

The RF module 2235, being connected to the processor 2210, transmits and/or receives an RF signal. The processor 2210 delivers command information to the RF module 2235 to initiate communication, for example, to transmit a radio signal comprising voice communication data. The RF module 2235 comprises a receiver and a transmitter to receive and transmit a radio signal. The antenna 2240 performs a function of transmitting and receiving a radio signal. When receiving a radio signal, the RF module 2235 may deliver the signal to be processed by the processor 2210 and convert the signal into the baseband. The processed signal may be converted to audible signal output through the speaker 2245 or readable information.

FIG. 23 illustrates one example of an RF module of a wireless communication device to which methods proposed in the present specification may be applied.

More specifically, FIG. 23 illustrates one example of an RF module that may be implemented in a Frequency Division Duplex (FDD) system.

First, along the transmission path, the processor described with reference to FIGS. 21 and 22 processes data to be transmitted and provides an analog output signal to the transmitter 2310.

Inside the transmitter 2310, an analog output signal is filtered by a low pass filter (LPF) 2311 to remove images caused by digital-to-analog conversion (ADC), transformed from the baseband up to an RF band by the mixer 2312, and amplified by a variable gain amplifier (VGA) 2313. The amplified signal is filtered by the filter 2314 and is further amplified by the power amplifier (PA) 2315, routed via duplexer(s) 2350/antenna switch(es) 2360, and transmitted through the antenna 2370.

Also, along the reception path, an antenna receives signals from the outside and provides the received signals, where these signals are routed via an antenna switch(es) 2360/duplexer(s) 2350 and are provided to the receiver 2320.

Inside the receiver 2320, received signals are amplified by a low noise amplifier (LNA) 2323 and filtered by a band-pass filter 232. The filtered signals are transformed from the RF band down to the baseband by a mixer 2325.

The down-converted signals are filtered by the low-pass filter (LPF) 2326 and are amplified by the VGA 2327, after which analog input signals are obtained to be provided to the processor described with reference to FIGS. 21 and 22.

Also, the local oscillator (LO) generator 2340 generates transmission and reception LO signals and provide the generated LO signals to the up-converter 2312 and down-converter 2325, respectively.

Also, the phase locked loop (PLL) 2330 receives control information from the processor to generate transmission and reception LO signals at appropriate frequencies and provides control signals to the LO generator 2340.

Also, the circuits shown in FIG. 23 may be arranged differently from the way the structure of FIG. 23 is arranged.

FIG. 24 illustrates another example of an RF module of a wireless communication device to which methods proposed in the present specification may be applied.

More specifically, FIG. 24 illustrates one example of an RF module that may be implemented in a Time Division Duplex (TDD) system.

The transmitter 2410 and the receiver 2420 of an RF module in the TDD system have the same structure as that of the transmitter and the receiver of the RF module of the FDD system.

In what follows, the RF module of the TDD system will be described with respect only to the structure that differs from that of the RF module of the FDD system, and descriptions of FIG. 23 should be consulted for the same part of the structure.

A signal amplified by a power amplifier (PA) 2415 of the transmitter is routed via a band select switch 2450, band-pass filter (BPF) 2460, and antenna switch(es) 2470 and is transmitted through an antenna 2480.

Also, along the reception path, the antenna receives signals from the outside and provide the received signals, where these signals are routed via an antenna switch(es) 2470, band-pass filter 2460, and band select switch 2450 and are provided to the receiver 2420.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although a method for transmitting and receiving downlink data in a wireless communication system according to the present specification has been described focusing on examples applying to the 3GPP LTE/LTE-A system, it can be applied to various wireless communication systems such as the 5G system other than the 3GPP LTE/LTE-A system.

The invention claimed is:

1. A method of receiving, by a user equipment (UE), a Physical Downlink Shared Channel (PDSCH) in a wireless communication system, the method comprising:
    transmitting, to a base station (BS), capability information including first information indicating whether to support an operation related to three types of PDSCH repetition and, second information indicating whether to support a configuration of a control region,
    wherein the three types of PDSCH repetition comprise a subframe-based PDSCH repetition indicated by a first parameter, a slot-based PDSCH repetition indicated by a second parameter, and a subslot-based PDSCH repetition indicated by a third parameter, and
    wherein the UE is capable of operating according any one of the three types of PDSCH repetition;
    receiving, from the BS, information for enabling the operation related to a Hybrid Automatic Repeat and Request (HARQ)-less/blind subframe-based PDSCH repetition;
    receiving, from the BS, configuration information for the control region via a higher layer signaling;
    based on the configuration information, receiving, from the BS, Downlink Control Information (DCI) related to the HARQ-less/blind subframe-based PDSCH repetition in the control region; and
    repeatedly receiving, from the BS, the PDSCH based on the DCI.

2. The method of claim 1, wherein the operation related to the three types of PDSCH repetition is supported based on configuration of the control region being supported.

3. A user equipment (UE) receiving a Physical Downlink Shared Channel (PDSCH) in a wireless communication system, the UE comprising:
    at least one transceiver transmitting and receiving a wireless signal; and
    at least one processor functionally connected to the at least one transceiver,
    wherein the at least one processor controls to:
    transmit, to a base station (BS), capability information including first information indicating whether to support an operation related to three types of PDSCH repetition and, second information indicating whether to support a configuration of a control region,
    wherein the three types of PDSCH repetition comprise a subframe-based PDSCH repetition indicated by a first parameter, a slot-based PDSCH repetition indicated by a second parameter, and a subslot-based PDSCH repetition indicated by a third parameter, and
    wherein the UE is capable of operating according any one of the three types of PDSCH repetition;
    receive, from the BS, information for enabling the operation related to a Hybrid Automatic Repeat and Request (HARQ)-less/blind PDSCH repetition;
    receive, from the BS, configuration information for the control region via a higher layer signaling;
    based on the configuration information, receive, from the BS, Downlink Control Information (DCI) related to the HARQ-less/blind subframe-based PDSCH repetition in the control region; and
    repeatedly receive, from the BS, the PDSCH based on the DCI.

4. The UE of claim 3, wherein the operation related to the three types of PDSCH repetition is supported based on configuration of the control region being supported.

5. A base station (BS) transmitting a Physical Downlink Shared Channel (PDSCH) in a wireless communication system, the BS comprising:
    at least one transceiver transmitting and receiving a wireless signal; and
    at least one processor functionally connected to the at least one transceiver,
    wherein the at least one processor controls to:
    receive, from a user equipment (UE), capability information including first information indicating whether to support an operation related to three types of PDSCH repetition and, second information indicating whether to support a configuration of a control region,
    wherein the three types of PDSCH repetition comprise a subframe-based PDSCH repetition indicated by a first parameter, a slot-based PDSCH repetition indicated by a second parameter, and a subslot-based PDSCH repetition indicated by a third parameter, and
    wherein the UE is capable of operating according any one of the three types of PDSCH repetition;
    transmit, to the UE, information for enabling the operation related to a Hybrid Automatic Repeat and Request (HARQ)-less/blind subframe-based PDSCH repetition;
    transmit, to the UE, configuration information for the control region via a higher layer signaling;
    based on the configuration information, transmit, to the UE, Downlink Control Information (DCI) related to the HARQ-less/blind subframe-based PDSCH repetition in the control region; and
    repeatedly transmit the PDSCH to the UE.

6. The BS of claim 5, wherein the operation related to the three types of PDSCH repetition is supported based on configuration of the control region being supported.

* * * * *